(12) United States Patent
Grau Besoli et al.

(10) Patent No.: US 8,892,125 B2
(45) Date of Patent: *Nov. 18, 2014

(54) RECEIVER UTILIZING MULTIPLE RADIATION PATTERNS TO DETERMINE ANGULAR POSITION

(71) Applicant: Broadcom Corporation, Irvine, CA (US)

(72) Inventors: Alfred Grau Besoli, Barcelona (ES); Nicolaos G. Alexopoulos, Irvine, CA (US); Jesus Castaneda, Los Angeles, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/038,010

(22) Filed: Sep. 26, 2013

(65) Prior Publication Data
US 2014/0030983 A1 Jan. 30, 2014

Related U.S. Application Data

(63) Continuation of application No. 12/475,479, filed on May 30, 2009, now Pat. No. 8,588,805.

(60) Provisional application No. 61/122,365, filed on Dec. 13, 2008.

(51) Int. Cl.
*H04W 24/00* (2009.01)
*H04B 17/00* (2006.01)
*H04B 7/08* (2006.01)

(52) U.S. Cl.
CPC ............ *H04B 17/0037* (2013.01); *H04B 7/084* (2013.01)
USPC .................................... 455/456.1; 455/456.6

(58) Field of Classification Search
CPC ........ H04W 4/02; H04W 64/00; H04B 7/084; H04B 17/0072
USPC .............. 455/456.1–456.2, 456.5–456.6, 461
See application file for complete search history.

(56) References Cited

U.S. PATENT DOCUMENTS 6,270,433 B1 * 8/2001 Orenstein et al. ............. 473/467
6,400,318 B1 * 6/2002 Kasami et al. ................ 342/383

(Continued)

*Primary Examiner* — Simon Nguyen
(74) *Attorney, Agent, or Firm* — Garlick & Markison; Kevin L. Smith

(57) ABSTRACT

A receiver includes an antenna array, an angular positioning module, a low noise amplifier module, and a down conversion module. The antenna array is operable to receive an inbound wireless signal. The angular positioning module is operable to: receive a plurality of received inbound wireless signals from the antenna array. An angular position of a source of the inbound wireless signal is determined from at least some of the plurality of received inbound wireless signals based on a first radiation pattern and a second radiation pattern of the plurality of received inbound wireless signals; and output a representation of the inbound wireless signal. The low noise amplifier module is operably coupled to amplify the representation of the inbound wireless signal to produce an amplified inbound wireless signal. The down conversion module is operably coupled to convert the amplified inbound wireless signal into a baseband or near baseband signal.

20 Claims, 18 Drawing Sheets

(56) References Cited

U.S. PATENT DOCUMENTS

| | | | |
|---|---|---|---|
| 6,618,008 B1* | 9/2003 | Scholz | 342/427 |
| 6,903,685 B1* | 6/2005 | Arndt et al. | 342/465 |
| 2004/0017313 A1* | 1/2004 | Menache | 342/465 |
| 2007/0142061 A1* | 6/2007 | Taubenheim et al. | 455/456.2 |
| 2007/0258560 A1* | 11/2007 | Armstrong et al. | 378/21 |
| 2010/0008588 A1* | 1/2010 | Feldkhun et al. | 382/206 |
| 2011/0133987 A1* | 6/2011 | Bernsten et al. | 342/417 |
| 2012/0299772 A1* | 11/2012 | Shtrom et al. | 342/359 |

* cited by examiner

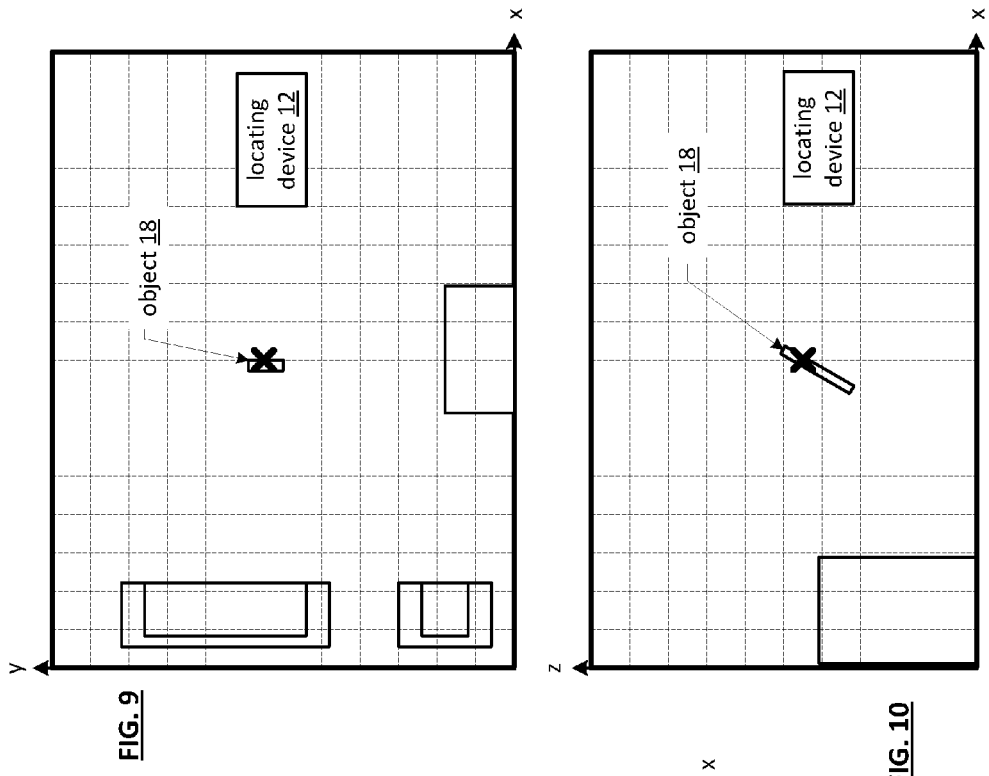
FIG. 9
FIG. 10
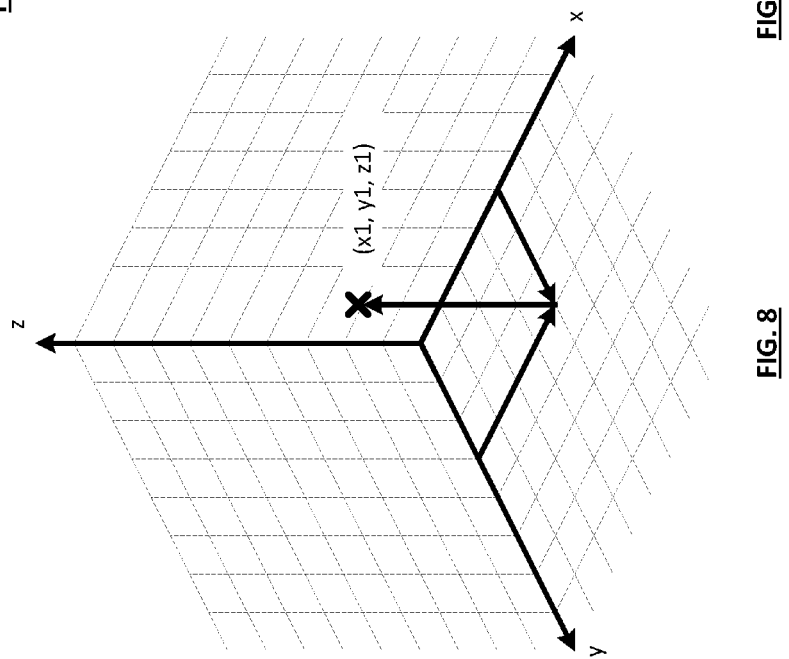
FIG. 8

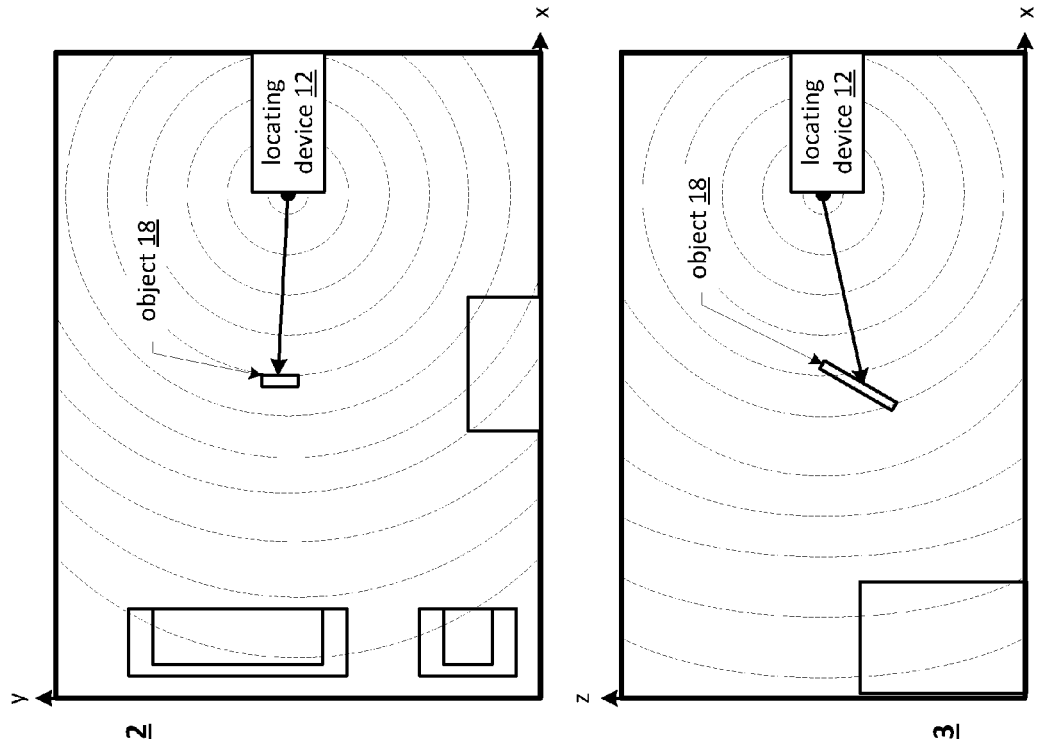
FIG. 12
FIG. 13
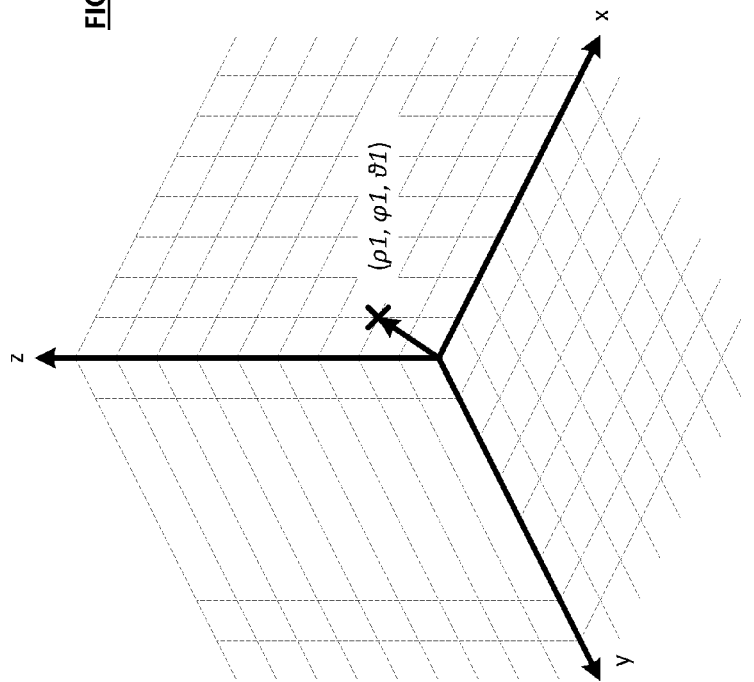
FIG. 11

RECEIVER UTILIZING MULTIPLE RADIATION PATTERNS TO DETERMINE ANGULAR POSITION

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 12/475,479, entitled "RECEIVER UTILIZING MULTIPLE RADIATION PATTERNS TO DETERMINE ANGULAR POSITION," filed May 30, 2009, issued as U.S. Pat. No. 8,588,805, on Nov. 19, 2013, which claims priority pursuant to 35 U.S.C. §119(e) to the following U.S. Provisional Patent Application which is hereby incorporated herein by reference in its entirety and made part of the present U.S. Utility Patent Application for all purposes:

1.1. U.S. Provisional Application Ser. No. 61/122,365, entitled "SUM AND DIFFERENCE ANTENNA STRUCTURE AND OPERATIONS," filed Dec. 13, 2008.

This patent application is related to U.S. Utility application Ser. No. 12/475,484, entitled "RECEIVER INCLUDING A MATRIX MODULE TO DETERMINE ANGULAR POSITION," filed May 30, 2009, now issued as U.S. Pat. No. 8,085,199, on Dec. 27, 2011

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless systems and more particularly to determining position within a wireless system and/or tracking motion within the wireless system.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, radio frequency (RF) wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof. As another example, infrared (IR) communication systems may operate in accordance with one or more standards including, but not limited to, IrDA (Infrared Data Association).

Depending on the type of RF wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each RF wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In most applications, radio transceivers are implemented in one or more integrated circuits (ICs), which are inter-coupled via traces on a printed circuit board (PCB). The radio transceivers operate within licensed or unlicensed frequency spectrums. For example, wireless local area network (WLAN) transceivers communicate data within the unlicensed Industrial, Scientific, and Medical (ISM) frequency spectrum of 900 MHz, 2.4 GHz, and 5 GHz. While the ISM frequency spectrum is unlicensed there are restrictions on power, modulation techniques, and antenna gain.

In IR communication systems, an IR device includes a transmitter, a light emitting diode, a receiver, and a silicon photo diode. In operation, the transmitter modulates a signal, which drives the LED to emit infrared radiation which is focused by a lens into a narrow beam. The receiver, via the silicon photo diode, receives the narrow beam infrared radiation and converts it into an electric signal.

IR communications are used in video games to detect the direction in which a game controller is pointed. As an example, an IR sensor is placed near the game display, where the IR sensor detects the IR signal transmitted by the game controller. If the game controller is too far away, too close, or angled away from the IR sensor, the IR communication will fail.

Further advances in video gaming include three accelerometers in the game controller to detect motion by way of acceleration. The motion data is transmitted to the game console via a Bluetooth wireless link. The Bluetooth wireless link may also transmit the IR direction data to the game console and/or convey other data between the game controller and the game console.

While the above technologies allow video gaming to include motion sensing, it does so with limitations. As mentioned, the IR communication has a limited area in which a player can be for the IR communication to work properly. Further, the accelerometer only measures acceleration such that true one-to-one detection of motion is not achieved. Thus, the gaming motion is limited to a handful of directions (e.g., horizontal, vertical, and a few diagonal directions).

Therefore, a need exists for improved motion tracking and positioning determination for video gaming and other applications.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIGS. 8-10 are diagrams of an embodiment of a coordinate system of a system in accordance with the present invention;

FIGS. 11-13 are diagrams of another embodiment of a coordinate system of a system in accordance with the present invention;

DETAILED DESCRIPTION OF THE INVENTION

Figure 1:
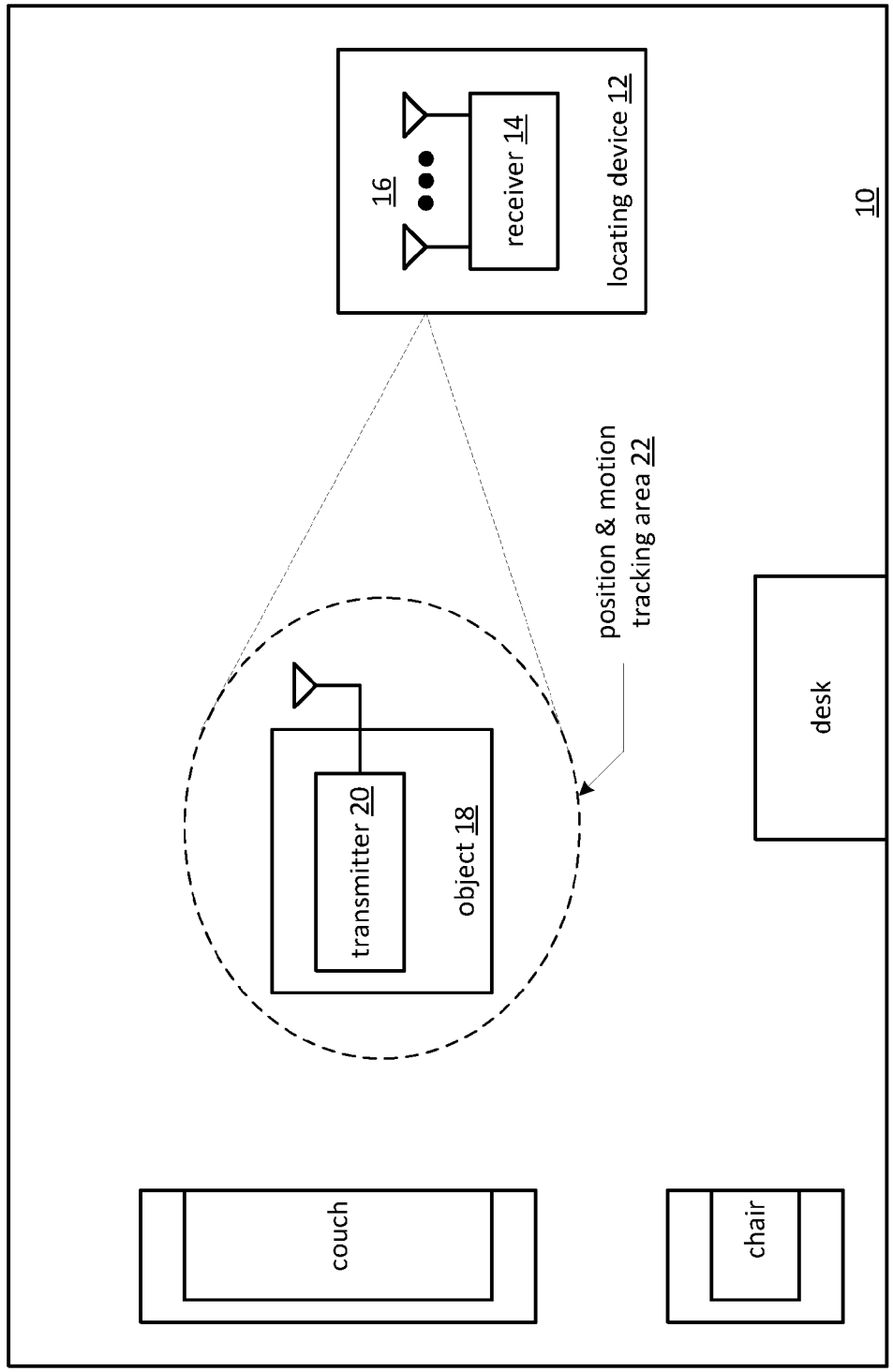
FIG. 1 is a schematic block diagram of an overhead view of an embodiment of a location system in accordance with the present invention.

FIG. 1 is a schematic block diagram of an overhead view of an embodiment of a location system 10 that includes a locating device 12 and transmitter 20 associated with an object 18 (e.g., a person, a device, an item, etc.). The locating device 12 includes a receiver 14, which, in turn, has an antenna array 16. The location system 10 is within an environment, which may be a room, portion of a room, and/or any other space where the object and the locating device can be proximally co-located (e.g., airport terminal, on a bus, on an airplane, etc.).

In operation, the locating device 12, via the receiver 14, may determine its environment by sweeping the area with one or more signals within one or more frequency bands. For example, the one or more signals may be in the ultrasound frequency band of 20 KHz to 200 MHz, the radio frequency band of 30 HZ to 3 GHz, the microwave frequency band of 3 GHz to 300 GHz, the infrared (IR) frequency band of 300 GHz to 428 THz, the visible light frequency band of 428 THz to 750 THz ($n \times 10^{12}$), the ultraviolet radiation frequency band of 750 THz to 30 PHz ($n \times 10^{15}$), and/or the X-Ray frequency band of 30 PHz to 30 EHz ($n \times 10^{18}$).

The determination of the environment continues with the locating device 12 measuring at least one of: reflection of the one or more signals, absorption of the one or more signals, refraction of the one or more signals, pass through of the one or more signals, angle of incident of the one or more signals, backscattering of the one or more signals, magnetization induced by the one or more signals to produce measured signal effects, and/or transmissions by transmitters (e.g., transmitter 20) located within the environment. The locating device 12 then identifies different objects based on the measured signal effects (e.g., inanimate objects have different reflective, absorption, pass through, and/or refractive properties of the one or more signals than animate beings) and specific objects associated with transmitters 20.

The locating device 12 then determines distance of the different objects 18 with respect to itself. From this data, the locating device 12 generates a three-dimensional topographic map of the area in which it resides to produce the environment. In this example, the environment includes the object 18, a couch, a chair, a desk, the four encircling walls, the floor, and the ceiling.

Having determined the environment, the locating device 12 maps the environment to a coordinate system (e.g., a three-dimensional Cartesian coordinate system [x, y, x], a spherical coordinate system [$\rho$, $\phi$, $\theta$], etc.). The locating device 12 then determines the position 22 of the object 18 within the gaming environment in accordance with the coordinate system.

Once the object's position is determined, the locating device tracks its motion. For example, the locating device 12 may determine the position of the object 20 within a positioning tolerance (e.g., within a meter) at a positioning update rate (e.g., once every second or once every few seconds) and tracks the motion within a motion tracking tolerance (e.g., within a few millimeters) at a motion tracking update rate (e.g., once every 10-100 milliseconds).

Figure 2:
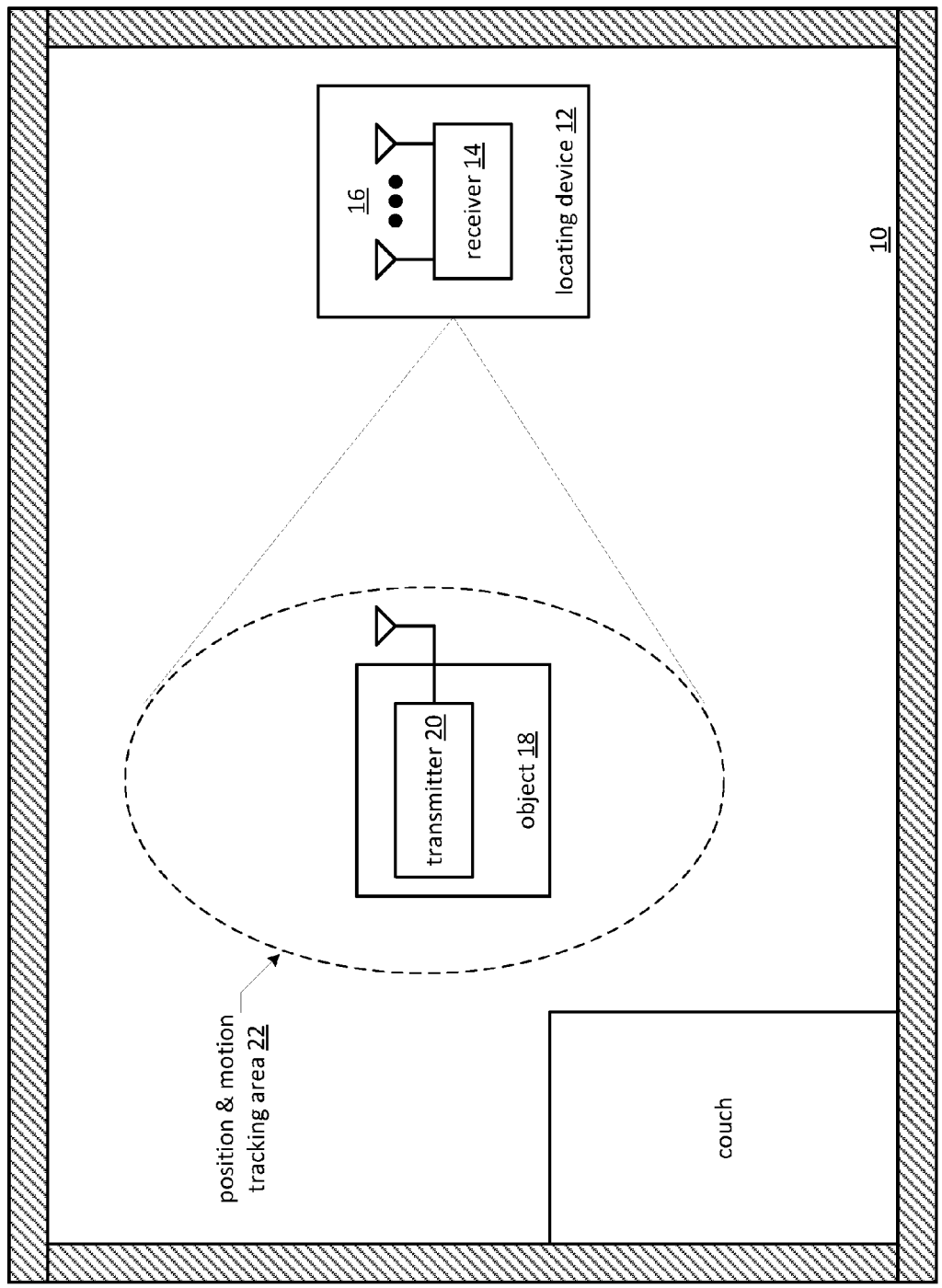
FIG. 2 is a schematic block diagram of a side view of an embodiment of a location system in accordance with the present invention.

FIG. 2 is a schematic block diagram of a side view of an embodiment of a location system 10 of FIG. 1 to illustrate that the position and motion tracking are done in three-dimensional space. Since the locating device 12 does three-dimensional positioning and motion tracking, the initial distance and/or angle of the object 18 to the locating device 12 is a negligible factor. As such, the locating system 10 provides accurate motion tracking of the object 18.

Figure 3:
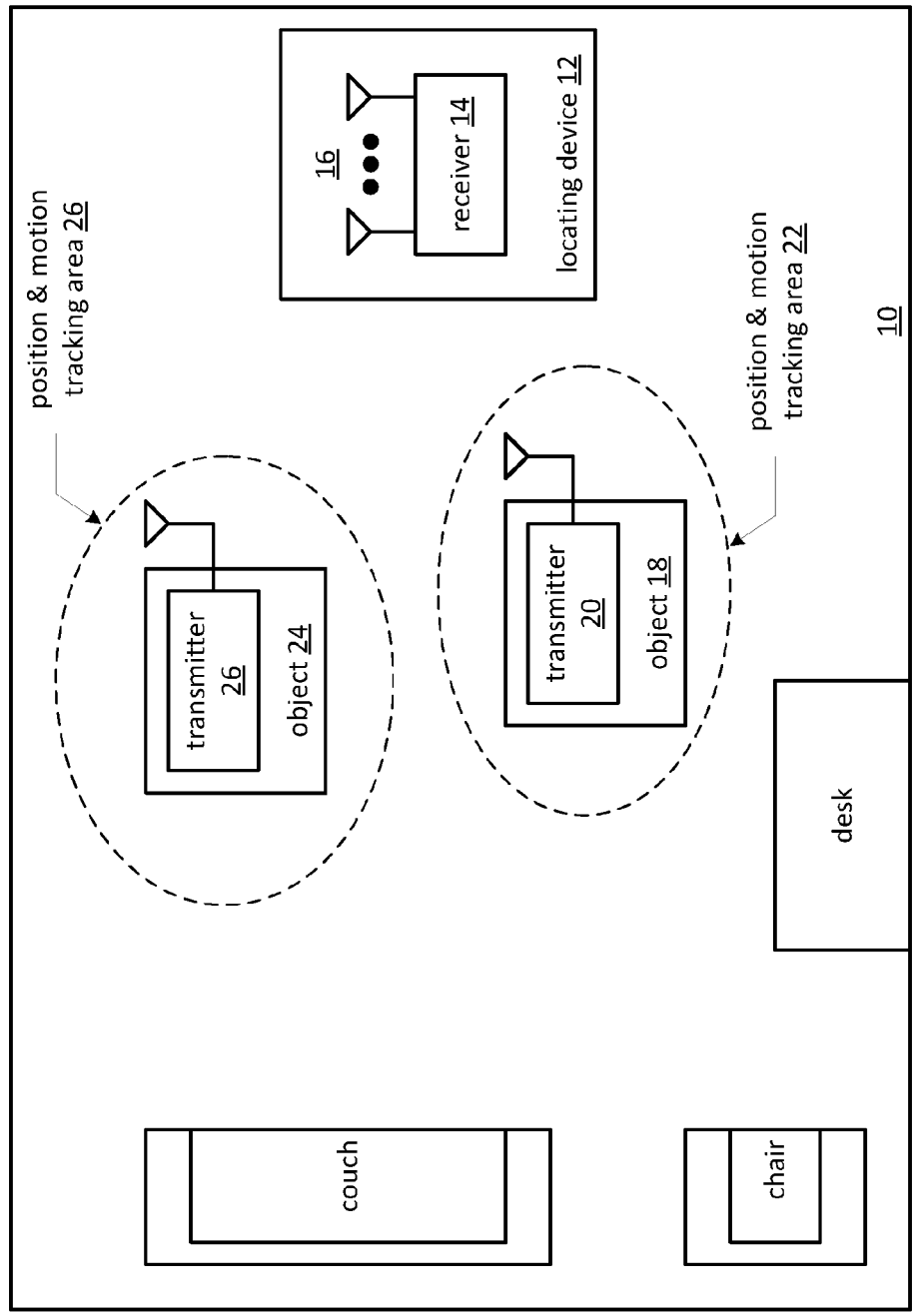
FIG. 3 is a schematic block diagram of an overhead view of another embodiment of a location system in accordance with the present invention.

FIG. 3 is a schematic block diagram of an overhead view of another embodiment of a location system 10 that includes a locating device 12 and a plurality of transmitters 20 & 26, each associated with an object 18 & 24 of a plurality of objects (e.g., a person, a device, an item, etc.). The location system is within an environment, which may be a room, portion of a room, and/or any other space where the object and the locating device can be proximally co-located (e.g., airport terminal, on a bus, on an airplane, etc.).

In operation, the locating device 12 may determine its environment as previously discussed and determines the position of each the objects 18 & 24 via the signal transmitted by its respective transmitter. Note that each transmitter 20 & 26 may have a unique identification code that is associated with an identification of the object. In this instance, each transmitter 20 & 26 transmits its respective signal in a time, frequency, and/or code division multiplexed manner using approximately the same carrier frequency or frequencies. In another instance, each transmitter 20 & 26 may be assigned a unique frequency of a plurality of frequencies, which it uses to transmit its signal.

Once an object's position is determined, the locating device 12 tracks its motion. For example, the locating device may determine the position of the object within a positioning tolerance (e.g., within a meter) at a positioning update rate (e.g., once every second or once every few seconds) and tracks the motion within a motion tracking tolerance (e.g., within a few millimeters) at a motion tracking update rate (e.g., once every 10-100 milliseconds).

Figure 4:
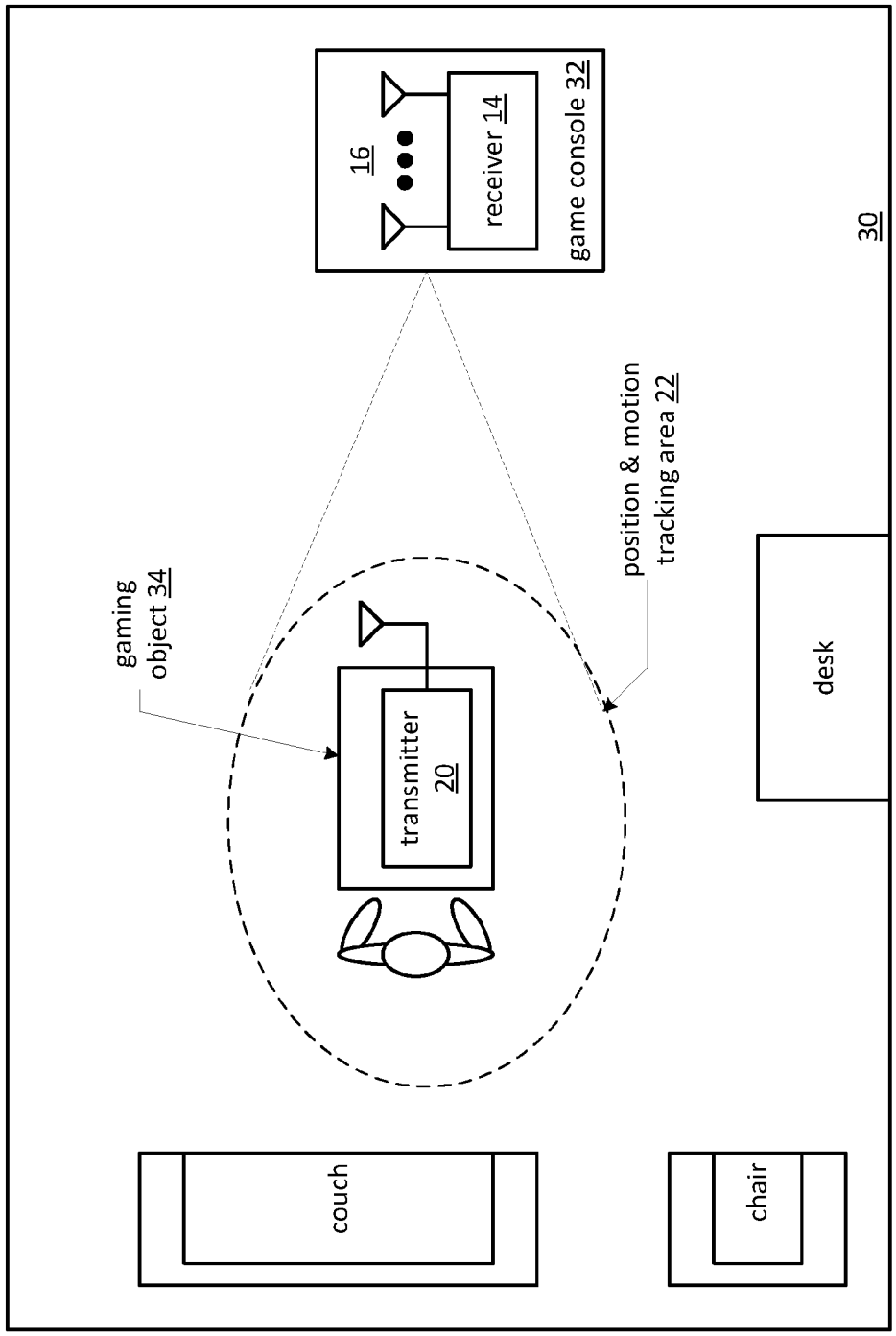
FIG. 4 is a schematic block diagram of an overhead view of an embodiment of a video gaming system in accordance with the present invention.

FIG. 4 is a schematic block diagram of an overhead view of an embodiment of a video gaming system 30 that includes a game console device 32 and a gaming object 34 associated with a player. The video game console device 32 includes the receiver 14 and the gaming object includes the transmitter 20. The video gaming system is within a gaming environment, which may be a room, portion of a room, and/or any other space where the gaming object and the game console device can be proximally co-located (e.g., airport terminal, on a bus, on an airplane, etc.).

In operation, the game console device 32 determines the gaming environment. This may be done by sweeping the area with one or more signals within one or more frequency bands. For example, the one or more signals may be in the ultrasound frequency band of 20 KHz to 200 MHz, the radio frequency band of 30 HZ to 3 GHz, the microwave frequency band of 3 GHz to 300 GHz, the infrared (IR) frequency band of 300 GHz to 428 THz, the visible light frequency band of 428 THz to 750 THz ($n \times 10^{12}$), the ultraviolet radiation frequency band of 750 THz to 30 PHz ($n \times 10^{15}$), and/or the X-Ray frequency band of 30 PHz to 30 EHz ($n \times 10^{18}$).

The determination of the gaming environment continues with the gaming console device 32 measuring at least one of: reflection of the one or more signals, absorption of the one or more signals, refraction of the one or more signals, pass through of the one or more signals, angle of incident of the one or more signals, backscattering of the one or more signals, magnetization induced by the one or more signals to produce measured signal effects, and/or signals transmitted by the transmitter 20. The game console device 32 then identifies different objects based on the measured signal effects (e.g., inanimate objects have different reflective, absorption, pass through, and/or refractive properties of the one or more signals than animate beings) and/or the transmitted signal by the transmitter 20.

The game console device 32 then determines distance of the different objects with respect to itself. From this data, the game console device generates a three-dimensional topographic map of the area in which the video gaming system resides to produce the gaming environment. In this example, the gaming environment includes the player, the gaming object, a couch, a chair, a desk, the four encircling walls, the floor, and the ceiling.

Having determined the gaming environment, the game console device maps the gaming environment to a coordinate system (e.g., a three-dimensional Cartesian coordinate system [x, y, x], a spherical coordinate system [$\rho$, $\phi$, $\theta$], etc.). The game console device 12 then determines the position of the player and/or the gaming object, which includes a transmitter, within the gaming environment in accordance with the coordinate system.

Once the gaming object's position is determined, the game console device tracks the motion of the player and/or the gaming object. For example, the game console device may determine the position of the gaming object and/or the player within a positioning tolerance (e.g., within a meter) at a positioning update rate (e.g., once every second or once every few seconds) and tracks the motion within a motion tracking tolerance (e.g., within a few millimeters) at a motion tracking update rate (e.g., once every 10-100 milliseconds).

During play of a video game, the game console device 12 receives a gaming object response regarding a video game function from the gaming object. The gaming object may be a wireless game controller and/or any object used or worn by the player to facilitate play of a video game. For example, the gaming object 34 may be a simulated sword, a simulated gun, a helmet, a vest, a hat, shoes, socks, pants, shorts, gloves, etc.

The game console device 32 integrates the gaming object response and the motion of the player and/or the gaming object with the video game function. For example, if the video game function corresponds to a video tennis lesson (e.g., a ball machine feeding balls), the game console device tracks the motion of the player and the associated gaming object 34 (e.g., a simulated tennis racket) and maps the motion with the feeding balls to emulate a real tennis lesson. The motion, which includes direction and velocity, enables the game console device 32 to determine how the tennis ball is being struck. Based on how it is being struck, the game console device 12 determines the ball's path and provides a video representation thereof.

Figure 5:
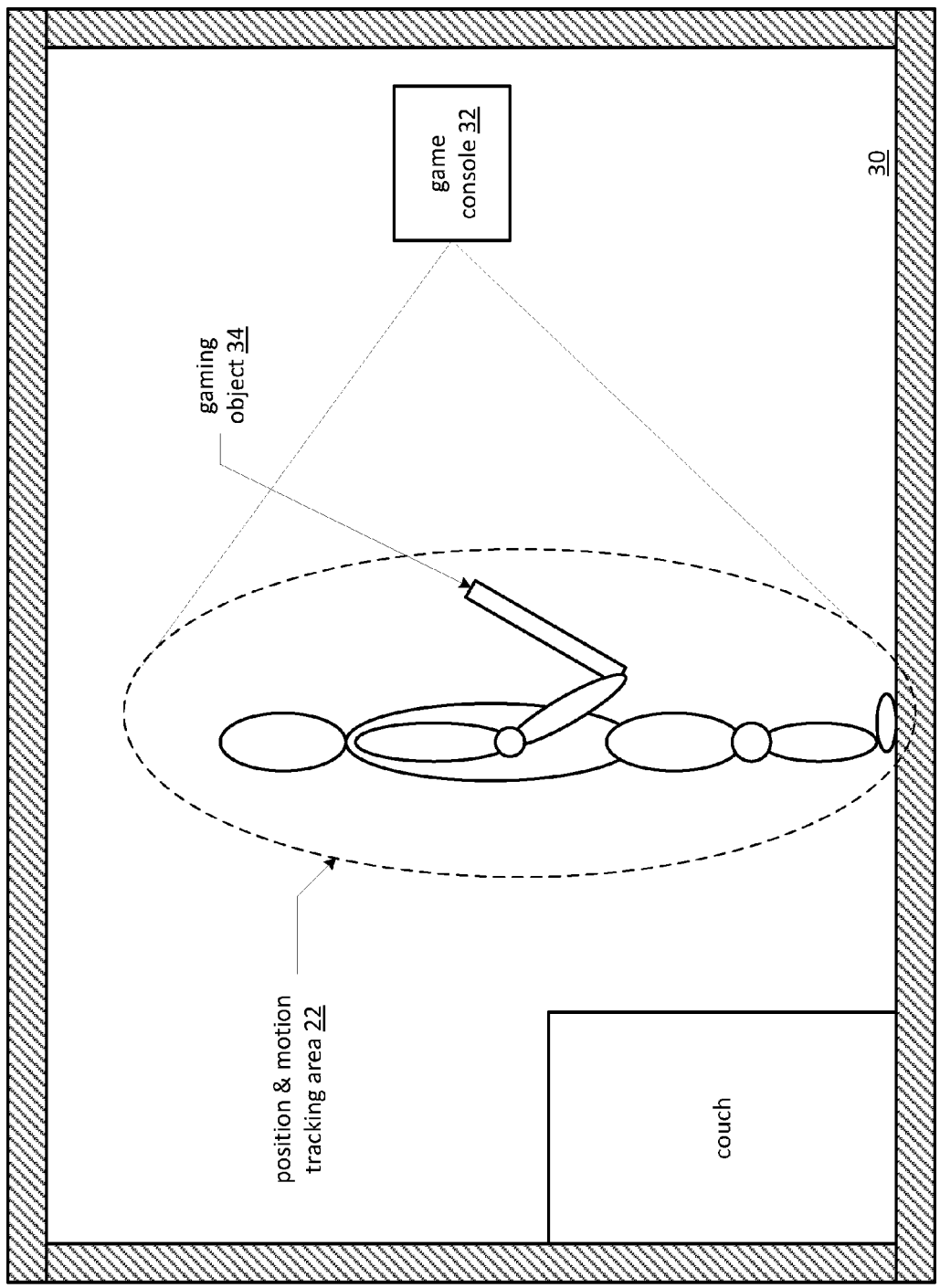
FIG. 5 is a schematic block diagram of a side view of an embodiment of a video gaming system in accordance with the present invention.

FIG. 5 is a schematic block diagram of a side view of an embodiment of the video gaming system 30 of FIG. 4 to illustrate that the position and motion tracking are done in three-dimensional space. Since the game console device does three-dimensional positioning and motion tracking, the initial distance and/or angle of the gaming object and/or player to the game console device is a negligible factor. As such, the gaming system provides accurate motion tracking of the gaming object and/or player, which may be used to map the player's movements to a graphics image for true interactive video game play.

Figure 6:
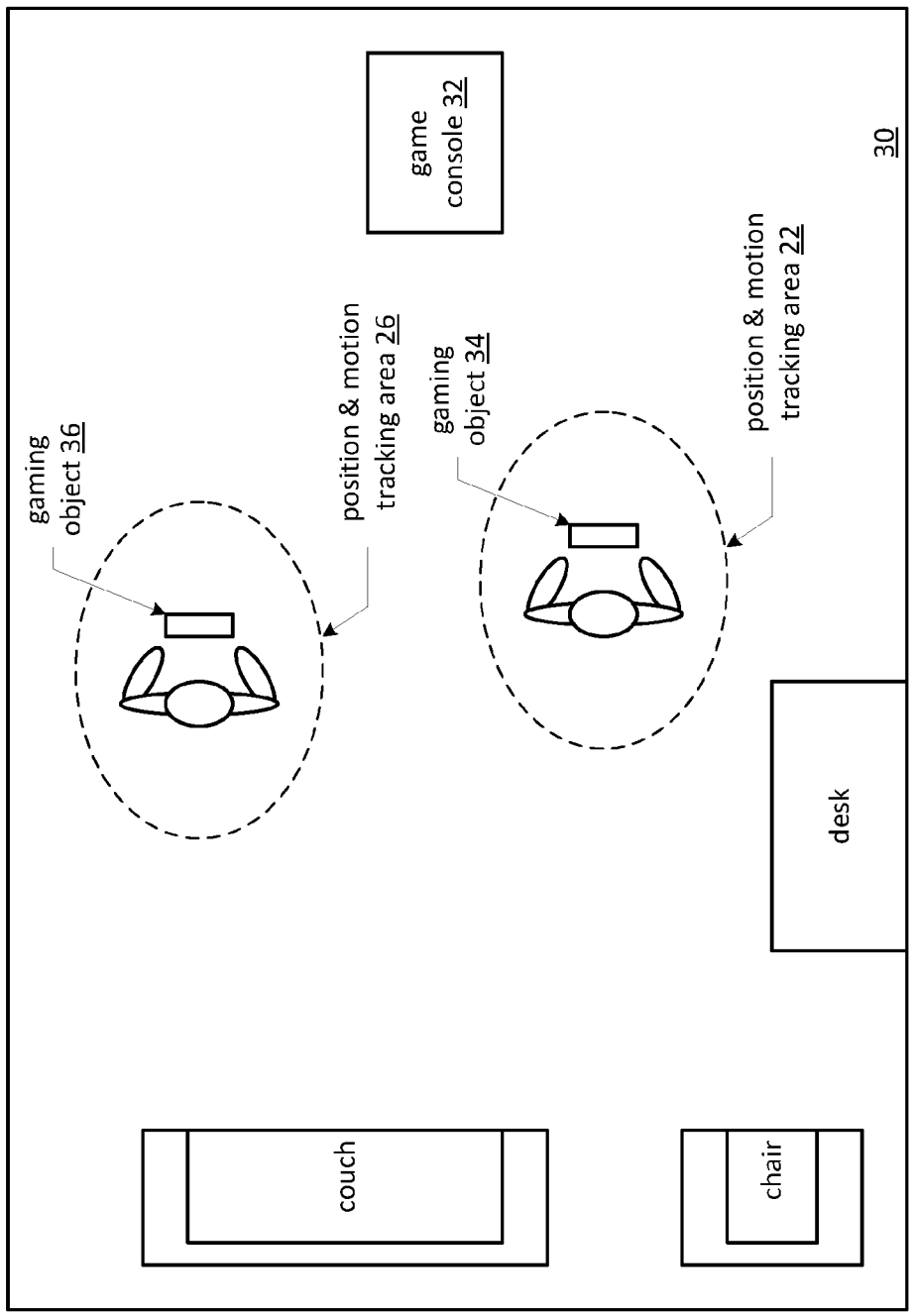
FIG. 6 is a schematic block diagram of an overhead view of another embodiment of a video gaming system in accordance with the present invention.

FIG. 6 is a schematic block diagram of an overhead view of another embodiment of a video gaming system 30 that includes a game console device 32, a plurality of players and a plurality of gaming objects 34 & 36; each of which includes a transmitter 20. In this system, the game console device 32 determines the position of the first player and/or the associated gaming object 34 within the gaming environment in accordance with the coordinate system. The game console device also determines the position of the second player and/or the associated gaming object 36 within the gaming environment in accordance with the coordinate system.

The game console device 32 separately tracks the motion of the first player, the motion of the first associated gaming object 34, the motion of the second player, and the motion of the second associated gaming object 36. While tracking the motion of the players and/or gaming objects, the game console may receive a gaming object response regarding the video game function from the first and/or the second associated gaming object.

The game console device 32 integrates the first and/or second gaming object response, the motion of the first player, the motion of the second player, the motion of the first associated gaming object 34, and the motion of the second associated gaming object 34 with the video game function. While the present example shows two players and associated gaming objects 34 & 36, more than two players and associated gaming objects could be in the gaming environment. In this instance, the game console device separately determines the position and the motion of the players and the associated gaming objects as previously discussed and integrates their play in the video gaming graphics being displayed.

Figure 7:
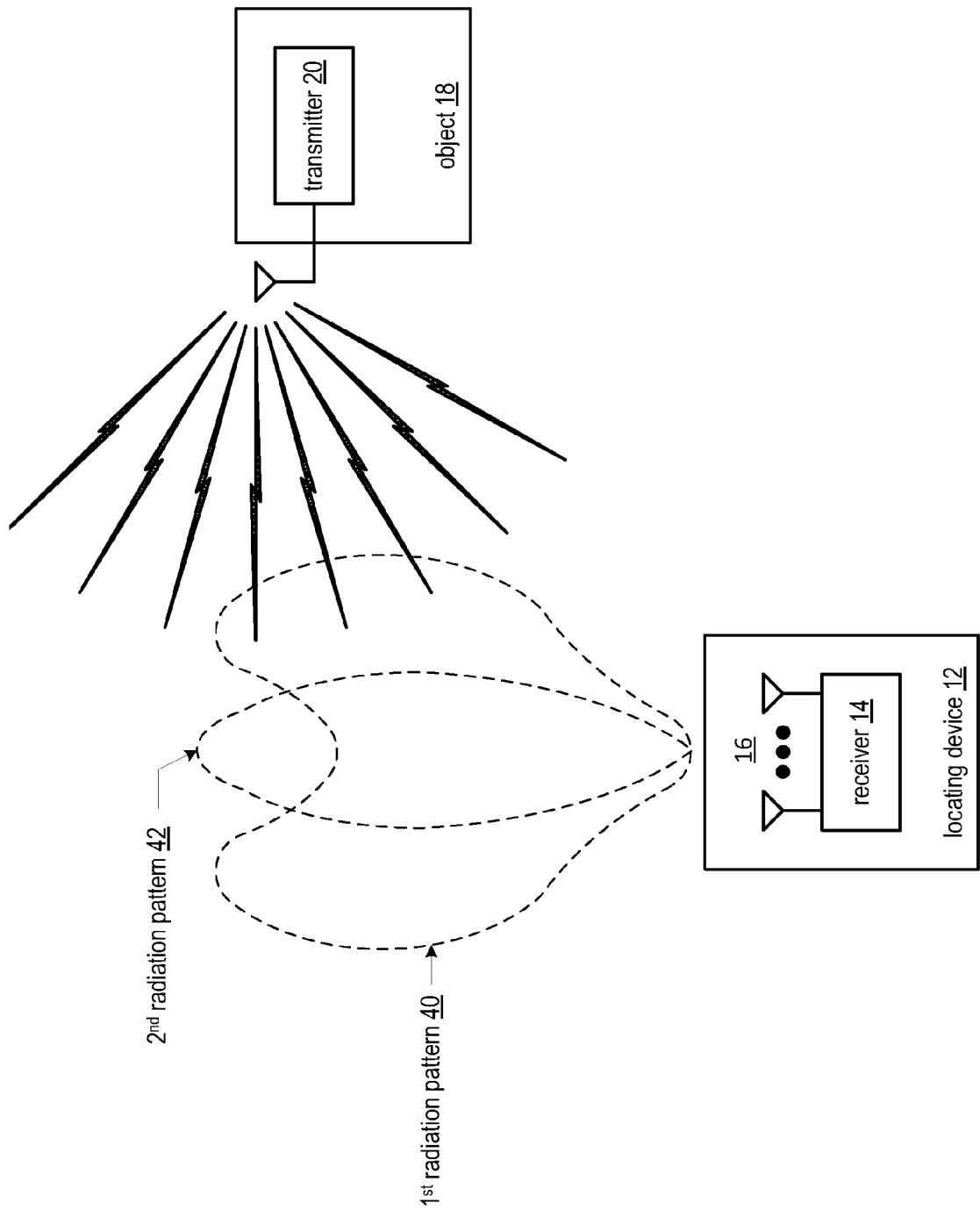
FIG. 7 is a schematic block diagram of another embodiment of a location system in accordance with the present invention.

FIG. 7 is a schematic block diagram of another embodiment of a location system that includes the locating device 12 and an object 18. The locating device includes a receiver 14 and the object includes the transmitter 20. In this example, the transmitter 20 transmits a beacon signal via an omni-directional antenna or one or more directional antennas. The beacon signal may be in the RF frequency band and/or in the millimeter wave (MMW) frequency band.

The receiver 13 includes an antenna 16 (which includes a plurality of antennas) and circuitry (which will be described with reference to FIGS. 15-23) to create a first antenna radiation pattern 40 and a second antenna radiation pattern 42. As shown, the radiation patterns may partially overlap and collectively provide a broader area of coverage than a single antenna radiation pattern. For example, the first radiation pattern 40 may be a sum pattern and the second radiation pattern 42 may be a difference pattern.

Via the antenna array, the receiver 14 receives the beacon signal from the transmitter 20. The receiver 14 interprets how the beacon signal is received with respect to each antenna radiation pattern to determine the angular location of the transmitter 20 and, hence, the object with respect to the receiver 14. The distance between the transmitter 20 and receiver 14 may be determined by interpreting one or more of amplitude, phase, and frequency of the received signal with known properties of the transmitted signal as described in co-pending patent application entitled VIDEO GAMING SYSTEM WITH POSITION AND MOTION TRACKING, having a filing date of May 22, 2008, and a Ser. No. 12/125, 154, now expired.

Figure 7A:
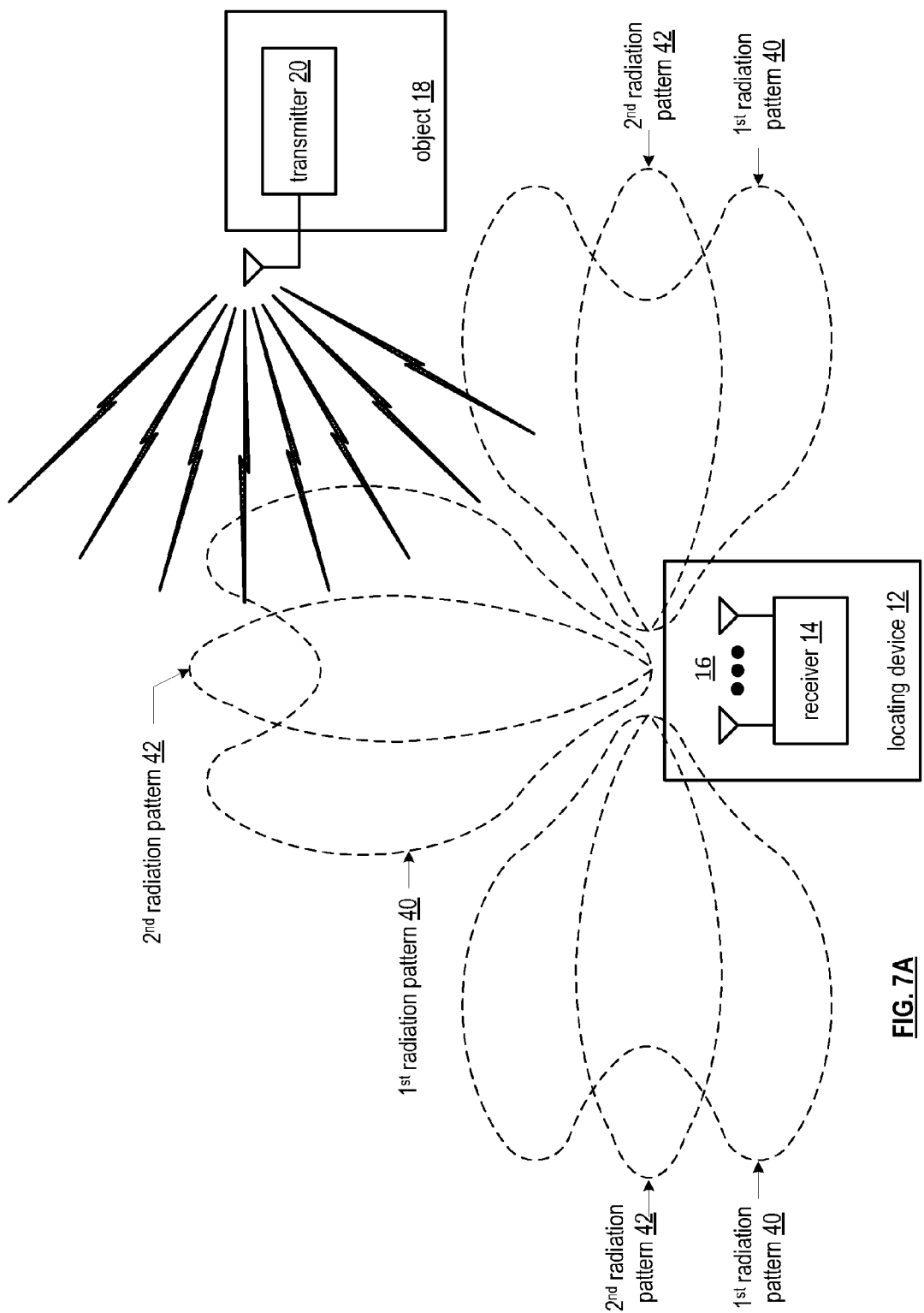
FIG. 7A is a schematic block diagram of another embodiment of a location system in accordance with the present invention.

FIG. 7A is a schematic block diagram of another embodiment of a location system that includes the locating device 12, which includes the receiver 14, and an object 18, which includes the transmitter 20. In this example, the transmitter transmits a beacon signal via an omni-directional antenna or one or more directional antennas. The beacon signal may be in the RF frequency band and/or in the MMW frequency band.

The receiver 14 includes the antenna array and to create a plurality of first and second antenna radiation patterns 40 and 42. As shown, the radiation patterns 40 & 42 may partially overlap and collectively provide a broader area of coverage than a single antenna radiation pattern. Each pair of radiation patterns 40 & 42 may be created in a serial fashion (e.g., one at a time) or in a parallel fashion (e.g., two or more patterns simultaneously).

Via the antenna array, the receiver 14 receives the beacon signal from the transmitter 20 and interprets how the beacon signal is received with respect to each antenna radiation pattern to determine the angular location of the transmitter 20 and, hence, the object. The distance between the transmitter and receiver may be determined by interpreting one or more of amplitude, phase, and frequency of the received signal with known properties of the transmitted signal as discussed in co-pending patent application entitled VIDEO GAMING SYSTEM WITH POSITION AND MOTION TRACKING, having a filing date of May 22, 2008, and a Ser. No. 12/125, 154.

FIGS. 8-10 are diagrams of an embodiment of a three-dimensional Cartesian coordinate system of a localized physical area that may be used for a location and/or gaming system. In these figures an x-y-z origin is selected to be somewhere in the localized physical area and the position and motion of the player and/or the object is determined with respect to the origin (e.g., 0, 0, 0). For example, a point (e.g., x1, y1, z1) on the object is used to identify its position in the environment. As the player object moves, its new position is identified within the gaming environment and the relation between the old point and the new point is used to determine three-dimensional motion.

FIGS. 11-13 are diagrams of an embodiment of a spherical coordinate system of a localized physical area that may be used for a location and/or gaming system. In these figures an origin is selected to be somewhere in the localized physical area and the position and motion of the object is determined with respect to the origin. For example, the position of the object may be represented as vector, or spherical coordinates, $(\rho, \phi, \theta)$, where $\rho \geq 0$ and is the distance from the origin to a given point P; $0 \leq \phi \leq 180°$ and is the angle between the positive z-axis and the line formed between the origin and P; and $0 \leq \theta \leq 360°$ and is the angle between the positive x-axis and the line from the origin to P projected onto the xy-plane. In general, $\phi$ is referred to as the zenith, co-latitude or polar angle, $\theta$ is referred to as the azimuth, $\phi$ and $\theta$ loses significance when $\rho=0$ and $\theta$ loses significance when $\sin(\phi)=0$ (at $\phi=0$ and $\phi=180°$). A point is plotted from its spherical coordinates, by going $\rho$ units from the origin along the positive z-axis, rotate $\phi$ about the y-axis in the direction of the positive x-axis and rotate $\theta$ about the z-axis in the direction of the positive y-axis.

For example, a point (e.g., $\rho 1, \phi 1, \theta 1$) on the object is used to identify its position in the environment. As the object moves, its new position is identified within the gaming environment and the relation between the old point and the new point is used to determine three-dimensional motion. While FIGS. 8-13 illustrate two types of coordinate system, any three-dimensional coordinate system may be used for tracking motion and/or establishing position within a gaming system.

Figure 14:
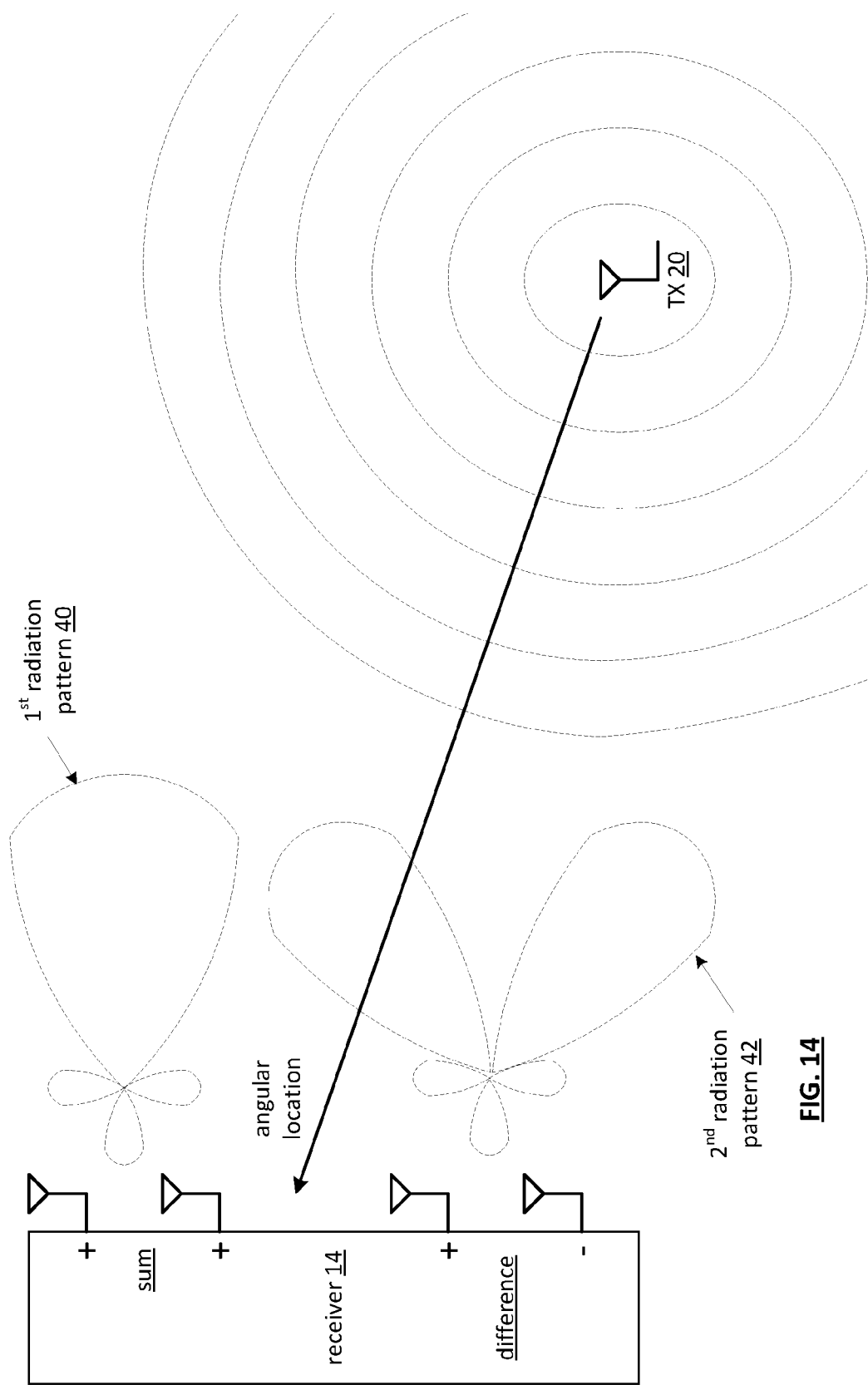
FIG. 14 is a schematic block diagram of an example of a location system in accordance with the present invention.

FIG. 14 is a schematic block diagram of an example of a location system 10 that includes the receiver 14 and the transmitter (TX) 20, of which only an antenna is shown. In this example, the transmitter 20 is transmitting a signal (e.g., a beacon signal, a video game request or response, etc.) via an omni-directional antenna. The receiver 14 receives the signal via the antennas of an antenna array 16 in two distinct patterns 40 and 42. For example, the receiver 14 may include circuitry such that the antennas receive the signal in a sum pattern and the second and a difference pattern. Note that the sum and difference patterns are shown separately for illustrative purposes, but, in practice, they are essentially superimposed.

In this example, let RX_A represent the signal received by a first one of the antennas, RX_B represent the signal received by a second one of the antennas, RX_C represent the signal received by a third one of the antennas, and RX_D represent the signal received by a fourth one of the antennas. The circuitry of the receiver produces the sum pattern, and hence a sum signal, by adding the received signals together (e.g., RX_A+RX_B+RX_C+RX_D) and produces the difference pattern, and hence a difference signal, by a performing a difference function (e.g., RX_A+RX_B−RX_C−RX_D).

The sum and difference signals are combined, or used independently, to identify the angular location of, and track the motion of, the object associated with the transmitter 20. Having identified the angular location, the antenna radiation pattern of the receiver may be adjusted in accordance with the angular location to improve reception of the transmitted signal.

Figure 15:
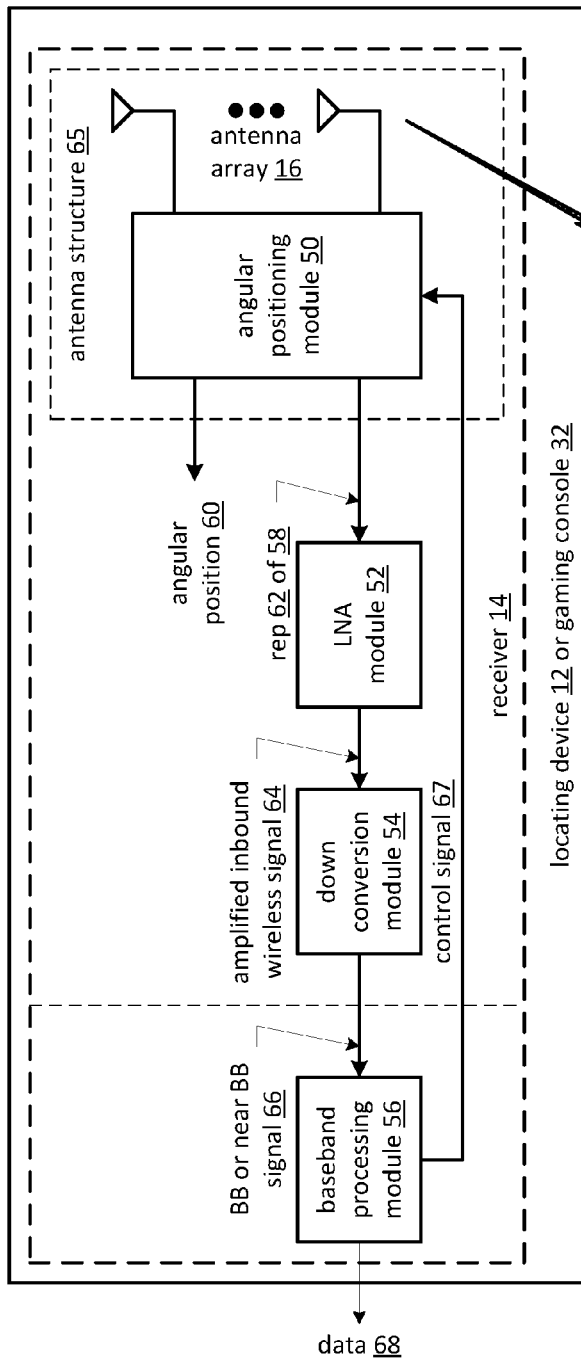
FIG. 15 is a schematic block diagram of an embodiment of a location device or gaming console in accordance with the present invention.

FIG. 15 is a schematic block diagram of an embodiment of a location device 12 or gaming console 32 that includes the receiver 14. The receiver 14 includes an antenna structure 65, a low noise amplifier module 52, and a down conversion module 54. The receiver may further include a baseband processing module 56. The antenna structure 65 includes the antenna array 16 (which includes two or more antennas) and an angular positioning module 50. The low noise amplifier module 52 includes one or more low noise amplifiers coupled in series and/or parallel. Note that the receiver 14 may be implemented using one or more integrated circuit circuits that contain the angular positioning module 50, the low noise amplifier module 52, the down conversion module 54, and may further include the baseband processing module 56.

The baseband processing module 56 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-23.

In an example of operation, the antenna array 16 receives an inbound wireless signal 58 from the transmitter 20. The inbound wireless signal 58 may be in accordance with one or more wireless communication standards or a proprietary communication protocol. In addition, the inbound wireless signal 58 may have a carrier frequency in the radio frequency (RF) frequency range and/or in the millimeter wave (MMW) frequency range. The antennas of the antenna array are implemented as a linear array (or a circular antenna array) and have a frequency response center frequency approximately equal to the carrier frequency of the inbound wireless signal 58.

Figure 23:
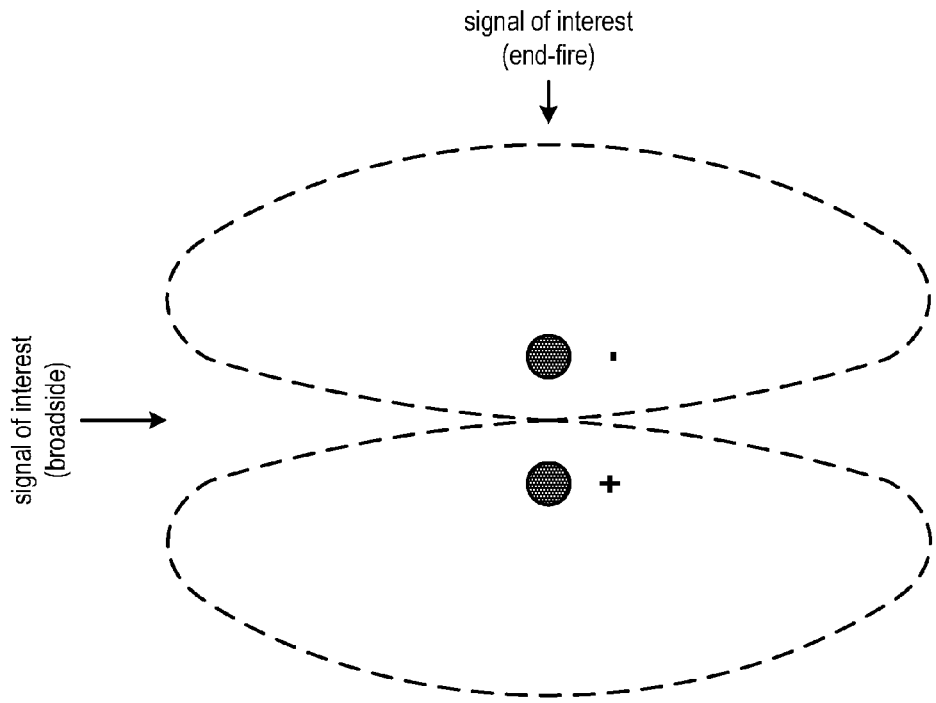
FIG. 23 is a diagram of an example of an end-fire antenna pattern in accordance with the present invention
Figure 22:
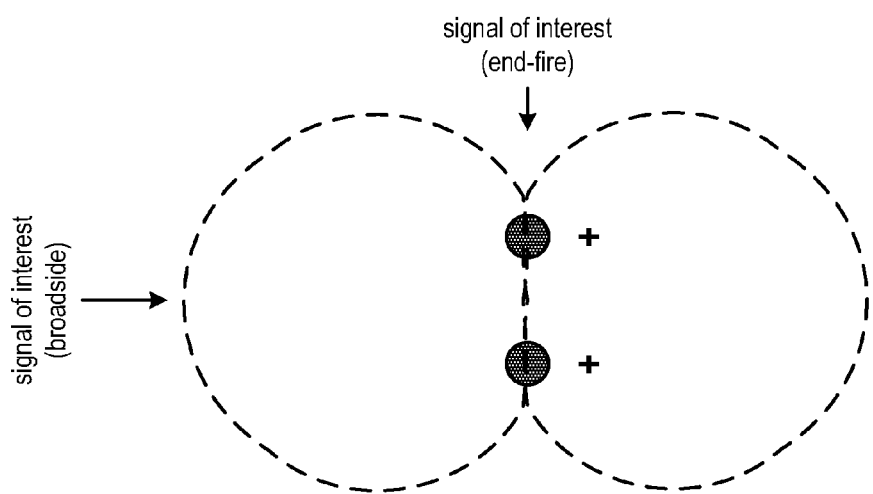
FIG. 22 is a diagram of an example of a broadside antenna pattern in accordance with the present invention.

The antenna array 16 may have pairs of its antennas configured in an end-fire manner as shown in FIG. 23. As shown in FIG. 23, two antennas are excited via different polarities (e.g., 180° of out phase) to produce the end-fire pattern. This produces a wider radiation pattern than a broadside pattern as shown in FIG. 22 (e.g., two antennas are excited via the same polarity) for a signal of interest (e.g., the transmitted signal). Alternatively, the antenna array may have its antennas arranged in a broadside manner to produce the first and second radiation patterns 40 and 42 or arranged in a combination of end-fire and broadside to produce the first and second radiation patterns 40 and 42.

Returning to the discussion of FIG. 15, the angular positioning module 50 (embodiments of which will be described in greater detail with reference to FIGS. 19-21) receives a plurality of received inbound wireless signals from the antenna array 16. The angular positioning module 50 determines an angular position 60 of a source of the inbound wireless signal from at least some of the received inbound wireless signals based on the first and second radiation patterns, which are established in accordance with a control signal 67. An example of this was provided in FIG. 14. The angular positioning module 50 also outputs a representation 52 of the received inbound wireless signal, which may be the plurality of received inbound wireless signals summed together, one of the received inbound wireless signals, or multiple ones of the received inbound wireless signals. Note that the angular positioning module may adjust the first and second radiation patterns in accordance with the control signal 67 to adjust reception strength (e.g., improve signal strength, improve signal to noise ratio, improve signal to interference ratio, etc.) of the inbound wireless signal. Further note that instead of receiving the control signal 67 from the baseband processing module 56, the angular positioning module 50 may include a processing module to generate the control signals and to determine the angular position 60.

The low noise amplifier module 52 amplifies the representation 52 of the inbound wireless signal to produce an amplified inbound wireless signal 64. The down conversion module 54 converts the amplified inbound RF signal(s) into a baseband or near baseband signal 66 (e.g., a carrier frequency of DC to a few MHz). In an embodiment, the down conversion module 54 mixes in-phase (I) and quadrature (Q) components of the amplified inbound RF signal with in-phase and quadrature components of receiver local oscillation to produce a mixed I signal and a mixed Q signal. The mixed I and Q signals are combined to produce the signal 66. In an embodiment, the signal 66 includes phase information (e.g., +/−Δθ [phase shift] and/or θ(t) [phase modulation]) and/or frequency information (e.g., +/−Δf [frequency shift] and/or f(t) [frequency modulation]). In another embodiment and/or in furtherance of the preceding embodiment, the inbound RF signal(s) include amplitude information (e.g., +/−ΔA [amplitude shift] and/or A(t) [amplitude modulation]). To recover the amplitude information, the down conversion module further includes an amplitude detector such as an envelope detector, a low pass filter, etc.

The baseband processing module 56 converts the baseband or near baseband signal 66 into inbound data 68 (e.g., video game user inputs, video game outputs, digital audio signals, digital video signals, graphics signals, etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

The baseband processing module 56 may also interpret the baseband or near baseband signal, the conversion of the baseband or near baseband signal 66, the inbound data 68, and/or other factors regarding the signal integrity of the inbound RF signals (e.g., received signal strength indication, bit error rate, signal to noise ratio, signal to interference ratio, etc.) to determine whether the current first and second antenna radiation patterns should be adjusted. If so, the baseband processing module generates a control signal 67 that it provides to the angular positioning module 50, which adjusts the patterns accordingly. In an alternate embodiment or in furtherance of the present embodiment, the baseband processing module may generate the control signal 67 in a manner that causes the angular positioning module 50 to generating a series of radiation patterns that effectively sweep the environment to find a transmitted beacon signal or other transmitted signal. Once a signal is found, the baseband processing module may generate a control signal 67 to effectively locks the radiation patterns on the angular location of the source of the signal such that the source's position can be determined and its motion tracked. Note that, alternatively, the angular positioning module 50 may generate some or all of the control signals 67.

In another example of operation, the antenna array of a video gaming console 32 receives an inbound wireless signal 58 from a video gaming object 34, which includes transmitter 20. The angular positioning module 50 receives a plurality of received inbound wireless signals from the antenna array 16. The angular positioning module 50 then determines angular position 60 of the source of the inbound wireless signal (e.g., the gaming module 34) from at least some of the plurality of received inbound wireless signals based on the first and second radiation patterns. The angular positioning module 50 also may output a representation 62 of the inbound wireless signal 58.

The low noise amplifier module 52 amplifies the representation 62 of the inbound wireless signal to produce an amplified inbound wireless signal 64. The down conversion module 54 converts the amplified inbound wireless signal 64 into a baseband or near baseband signal 66. The baseband processing module 56 converts the baseband or near baseband signal 66 into video gaming data 68.

Figure 16:
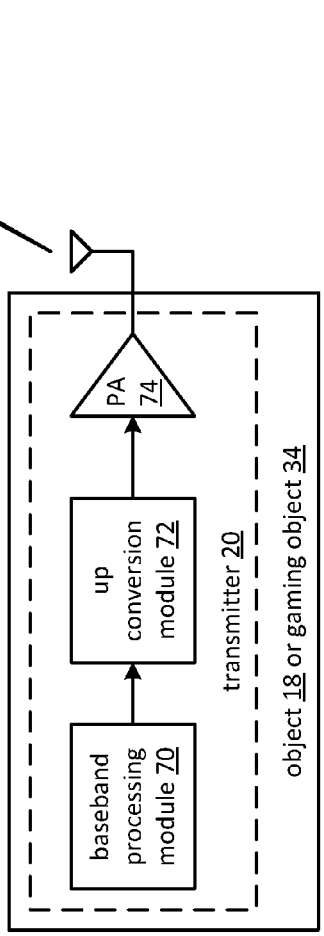
FIG. 16 is a schematic block diagram of an embodiment of an object or gaming object in accordance with the present invention.

FIG. 16 is a schematic block diagram of an embodiment of an object 18 or gaming object 34 that includes the transmitter 20. The transmitter 20 includes a baseband processing module 70, an up conversion module 72, and a power amplifier module (PA) 74, which is coupled to one or more antennas.

In an example of operation, the baseband processing module 70 converts outbound data (e.g., a beacon signal, video game user inputs, video game outputs, digital audio signals, digital video signals, graphics signals, etc.) into an outbound symbol stream. Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

The up conversion module 72 converts the outbound symbol stream into one or more outbound RF signals that has a carrier frequency within a given frequency band (e.g., 1800 MHz, 2.4 GHz, 5 GHz, 57-66 GHz, etc.). The power amplifier module 74, which includes one or more power amplifier drivers and/or power amplifiers coupled in series and/or in parallel, amplifies the one or more outbound wireless signals 58, which are subsequently transmitted via the antenna(s).

In an embodiment, the up conversion module 72 mixes the outbound symbol stream with a local oscillation to produce an up-converted signal. One or more power amplifiers and/or power amplifier drivers amplifies the up-converted signal, which may be RF bandpass filtered, to produce the outbound RF signal(s). In another embodiment, the up conversion module 72 includes an oscillator that produces an oscillation. The outbound symbol stream provides phase information (e.g., +/−Δθ [phase shift] and/or θ(t) [phase modulation]) that adjusts the phase of the oscillation to produce a phase adjusted RF signal(s), which is transmitted as the outbound RF signal(s). In another embodiment, the outbound symbol stream includes amplitude information (e.g., A(t) [amplitude modulation]), which is used to adjust the amplitude of the phase adjusted RF signal to produce the outbound RF signal.

In yet another embodiment, the up conversion module 72 includes an oscillator that produces an oscillation. The outbound symbol provides frequency information (e.g., +/−Δf [frequency shift] and/or f(t) [frequency modulation]) that adjusts the frequency of the oscillation to produce a frequency adjusted RF signal(s), which is transmitted as the outbound RF signal(s). In another embodiment, the outbound symbol stream includes amplitude information, which is used to adjust the amplitude of the frequency adjusted RF signal to produce the outbound RF signal(s). In a further embodiment, the up conversion module includes an oscillator that produces an oscillation. The outbound symbol provides amplitude information (e.g., +/−ΔA [amplitude shift] and/or A(t) [amplitude modulation) that adjusts the amplitude of the oscillation to produce the outbound RF signal(s).

Figure 17:
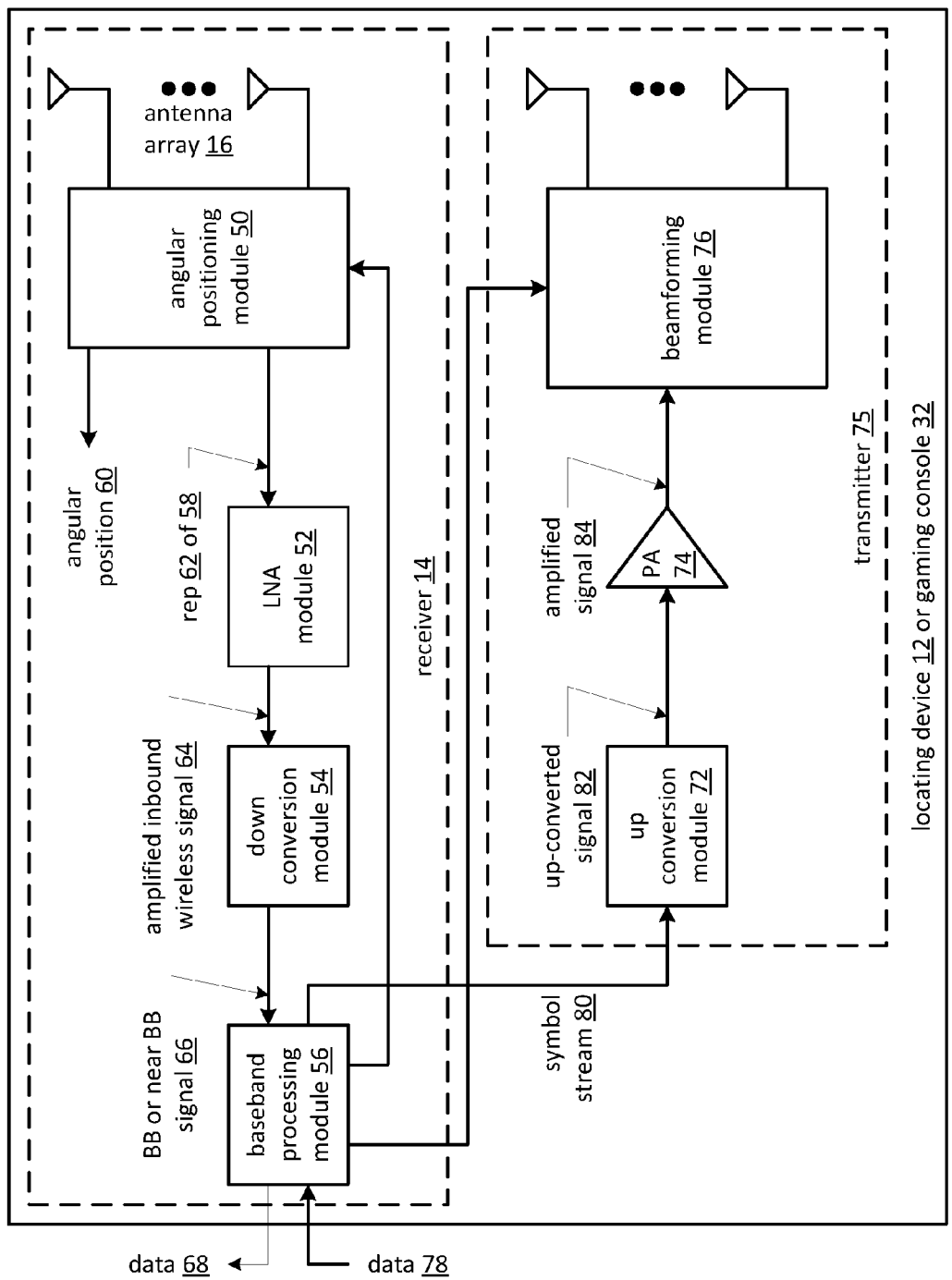
FIG. 17 is a schematic block diagram of another embodiment of a location device or gaming console in accordance with the present invention.

FIG. 17 is a schematic block diagram of another embodiment of a location device 12 or gaming console 32 that includes the receiver 14 and may further include a transmitter 75. The transmitter 75 includes an up-conversion module 72, a power amplifier module 74, and a beamforming module 76. In this embodiment, the receiver 14 functions as previously described.

In an example of operation of the transmitter 75, the baseband processing module 56 converts outbound data 78 into an outbound symbol stream 80. This may be done in a manner as previously discussed with reference to the baseband processing module 70 of FIG. 16. The up-conversion module 72 converts the symbol stream 80 into an upconverted signal 82 and the power amplifier module 74 amplifies the upconverted signal 82 to produce an amplified signal 84 in a manner as discussed with reference to FIG. 16.

The beamforming module 76, if included, generates a plurality of phase offset wireless signals from the amplified signal 84. The antenna array transmits the phase offset wireless signals to produce, in air, a beamformed signal. Note that the antenna array of the transmitter 75 may be a separate antenna array from array 16 or may be the same array. In the latter case, the transmitter 75 and receiver 14 are sharing the antenna array 16.

Figure 18:
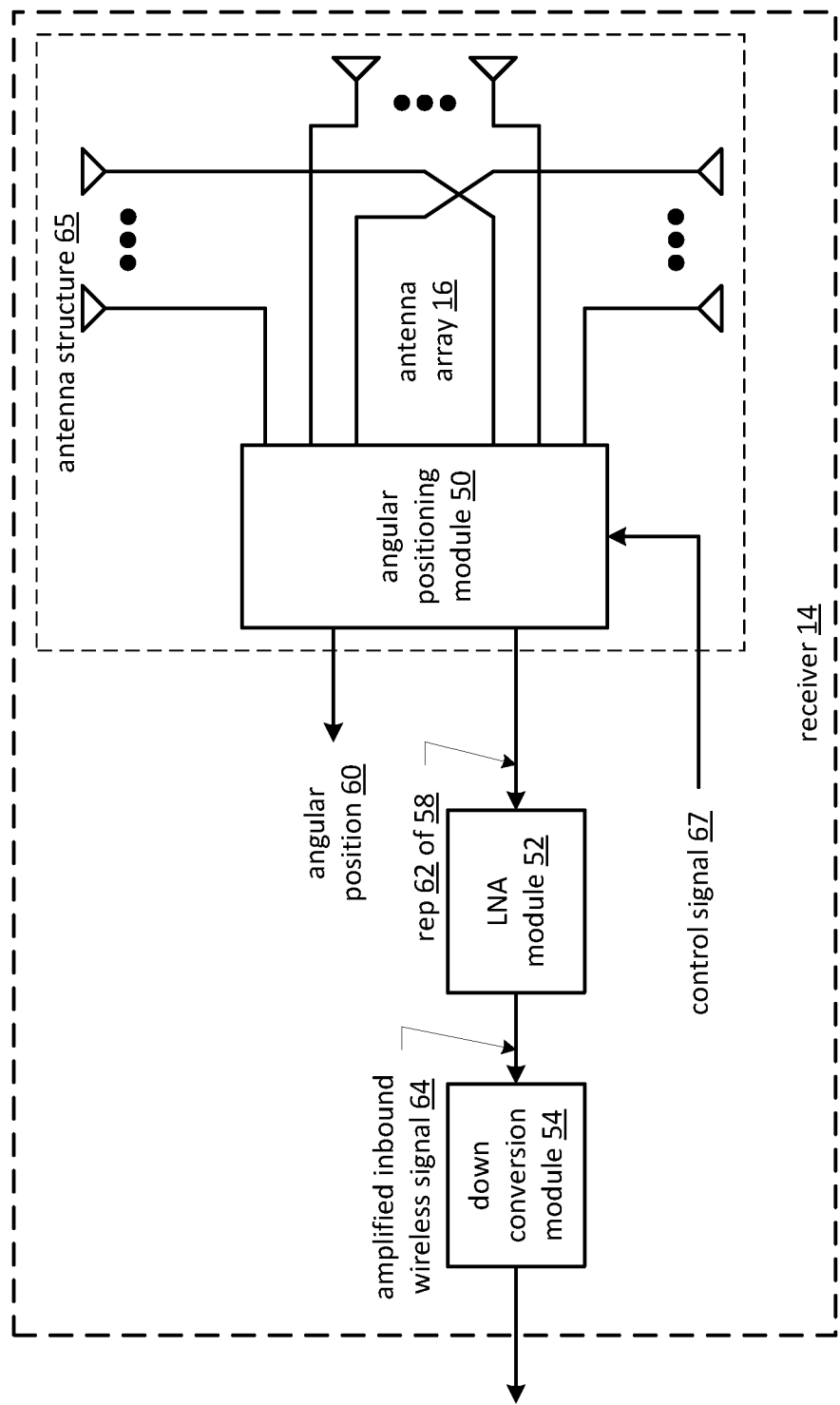
FIG. 18 is a schematic block diagram of another embodiment of a location device or gaming console in accordance with the present invention.

FIG. 18 is a schematic block diagram of another embodiment of the receiver 14 that includes the antenna arrays 16, the angular positioning module 50, the low noise amplifier module 52, and the down conversion module 54. The antenna array 16, which is part of the antenna structure, includes at least two sets of antennas, where each set has a different polarization (e.g., 0°, 90°, 180°, and/or 270°, clockwise and counterclockwise, etc.) with respect to the other sets.

In an example of operation, the angular positioning module 50 may utilize each set of antennas separately or in concert. For example, the angular positioning module 50 may be configured to receive the inbound wireless signals from a first set of antennas and process the signals as described above. Next, the angular positioning module 50 receives the inbound wireless signals from a second set of the antennas and processes the signals. This continues for the remaining sets. The collective angular positions determined from each set of antennas may be compiled to produce a resulting angular position.

As another example, the angular processing module 50 may receive the inbound wireless signal from each set of the antennas. The received signals are processed as described above to produce the angular position.

Figure 19:
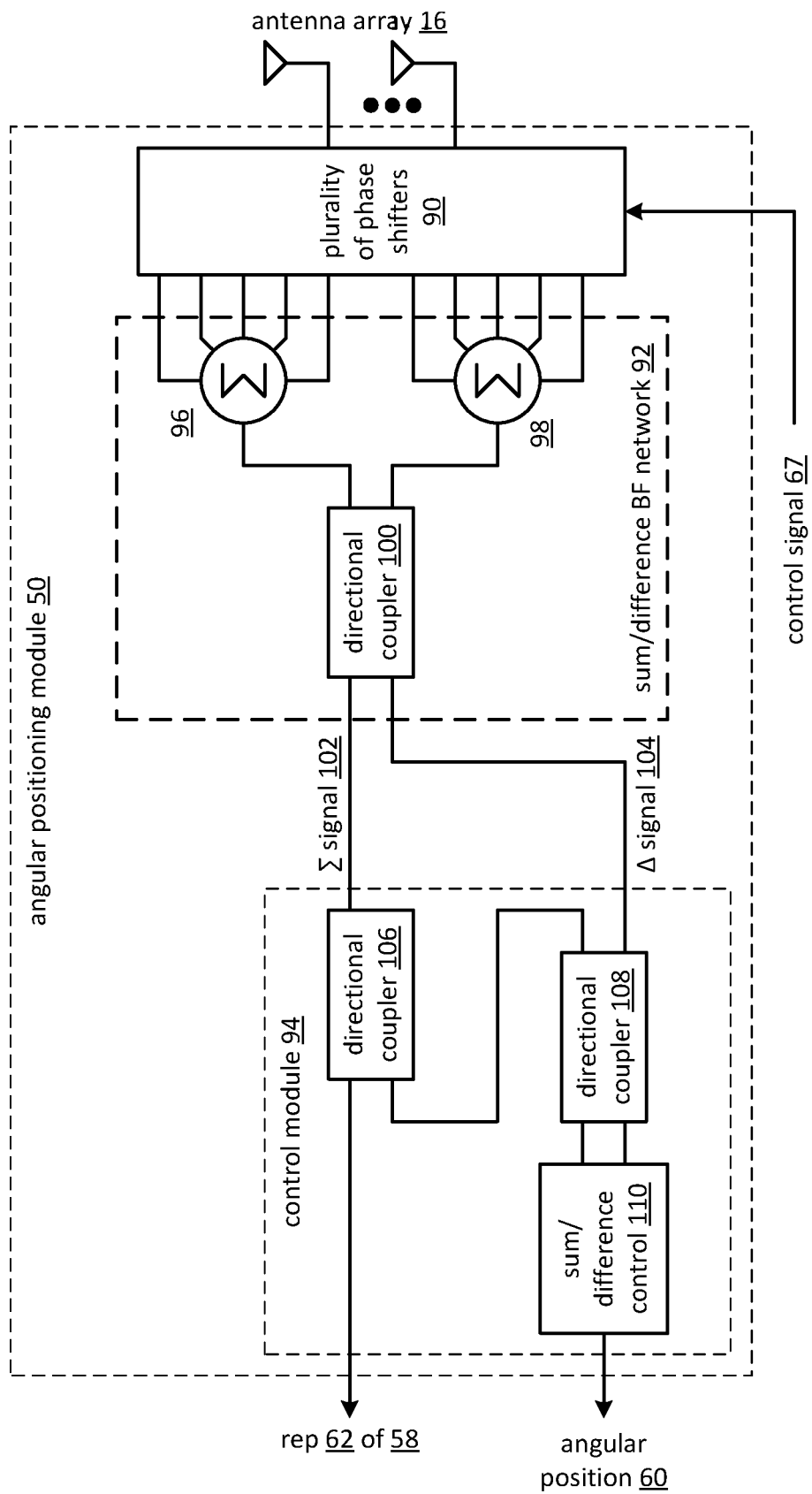
FIG. 19 is a schematic block diagram of an embodiment of an angular positioning module in accordance with the present invention.

FIG. 19 is a schematic block diagram of an embodiment of an angular positioning module 50 that includes a plurality of phase shifters 90, a sum/difference beamforming (BF) network 92, and a control module 94. The sum/difference beamforming (BF) network 92 includes a directional coupler 100, a summing module 96 and a difference module 98. The control module 94 includes directional couplers 106 & 108 and a sum/difference control unit 110. In an embodiment, the number of phase shifters corresponds to the number of antennas of the antenna array 16.

In an example of operation, the antenna array 16 receives an inbound wireless signal. Each antenna of the array provides its respective inbound wireless signal to a corresponding one of the plurality of phase shifters 90. Each phase shifter, which may have a 6-7 bit control input to provide $2^6$ to $2^7$ different phase shift settings, phase shifts the received wireless signals to produce a plurality of phase shifted inbound wireless signals. The summing module 96 sums the plurality of phase shifted inbound wireless signals to produce a summed signal. The difference module 98 performs a difference function on the plurality of phase shifted inbound wireless signals to produce a difference signal.

As an example for four antennas in the array 16, let RX_A represent the signal received by a first one of the antennas, RX_B represent the signal received by a second one of the antennas, RX_C represent the signal received by a third one of the antennas, and RX_D represent the signal received by a fourth one of the antennas. The summing module 96 add the received signals together (e.g., RX_A+RX_B+RX_C+RX_D) and the difference module performs the difference function (e.g., RX_A+RX_B−RX_C−RX_D). If the signals are all identical, then the summed signal is 4*RX_A and the difference signal 104 is zero. If the signals are not equal, then the summed signal will be less than 4*RX_A and difference signal will be greater than zero. The directional coupler 100 partially couples the summed signal and the difference signal to produce a resulting sum signal (Σ signal) 102 and a resulting difference signal (Δ signal) 104. The control module 94 receives the resulting sum and difference signals 102 and 104 via directional couplers 106 & 108. From these signals, the sum/difference control unit 110 determines the angular location 60 of the source of the inbound wireless signal. The sum/difference control unit 110 may provide the control signal 67 (e.g., phase shift coefficients) to the phase shifters 90 such that the phase shifters 90 adjust their respective phase shifts, which yields adjusted first and second radiation patterns. Note that directional coupler 106 provides the output signal (e.g., the representation 62 of the inbound wireless signal 58).

As another example, assume that the antenna array includes two antennas having a physical separation. Further assume that the inbound wireless signal may be represented as $A(t)*\cos(\omega_{RF}+\phi)(t))$, where the inbound RF signal received by the first antenna may be expressed as $A_1(t)*\cos(\omega_{RF}+\phi_1(t))$ and the inbound RF signal received by the second antenna may be expressed as $A_2(t)*\cos(\omega_{RF}+\phi_2(t)$. A first phase shifter adjusts the phase of the first inbound RF signal by a first phase adjust ($\theta_1$) to produce a first phase adjusted signal $A_1(t)*\cos(\omega_{RF}+\phi_1(t)+\theta_1)$. A second phase shifter adjusts the phase of the second inbound RF signal by a second phase adjust ($\theta_2$) to produce a second phase adjusted signal $A_2(t)*\cos(\omega_{RF}+\phi_2(t)+\theta_2)$. The first and second phase adjust values may be default values set based on an arbitrary point in space in relation to the first and second antennas' physical position.

The summing module 96 sums the phase adjusted first and second inbound wireless signals to produce the summed signal $(A_1(t)+A_2(t))*\cos(\omega_{RF}+(\phi_1(t)+\phi_2(t))+(\theta_1+\theta_2))$. The difference module performs the difference function on the signals to produce the difference signal $(A_1(t)-A_2(t))*\cos(\omega_{RF}+(\phi_1(t)-\phi_2(t)+(\theta_1-\theta_2))$. As can be seen by reviewing the difference signal, if the antennas receive the inbound RF signal identically, the difference signal would be zero and the sum signal will be twice the inbound RF signal. If the antennas do not receive the inbound RF signal identically, the difference signal will not be zero and the sum signal will be less than twice the inbound RF signal. Based on these variations from the identical reception, the angular location can be determined and/or the phase shifters may be adjusted to increase the sum signal and reduce the difference signal, or vice versa.

Figure 20:
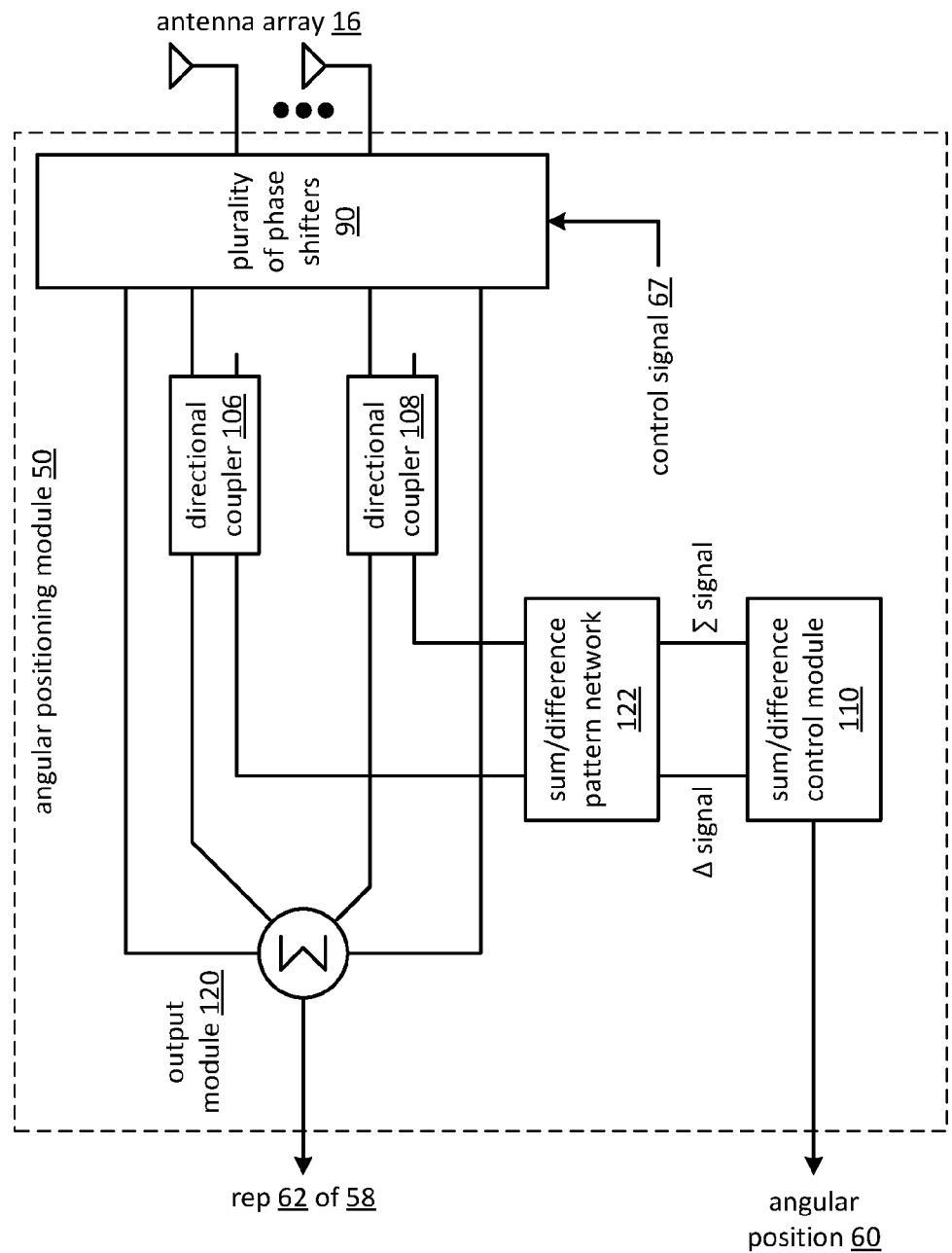
FIG. 20 is a schematic block diagram of another embodiment of an angular positioning module in accordance with the present invention.

FIG. 20 is a schematic block diagram of another embodiment of an angular positioning module 50 that includes the plurality of phase shifters 90, directional couplers 106 and 108, a sum/difference pattern network 122, the sum/difference control module 110, and an output module 120. The plurality of phase shifters 90 is coupled to the antenna array 16 may include an equal number of phase shifters as antennas in the antenna array 16.

In an example of operation, the plurality of phase shifters phase shifts the plurality of received inbound wireless signals to produce a plurality of phase shifted inbound wireless signals. The sum-difference patterns network 122, which may be 180° hybrid circuit, generates a sum signal 102 and a difference signal 104 from at least two of the plurality of phase shifted inbound wireless signals. For example, in a four port 180° hybrid circuit, if the inputs are placed on ports 1 and 3, the resulting output signals will be in phase; if ports 2 and 4 are used for inputs, then the resulting output signals are out of phase; and if the ports 2 and 3 are used, the output at port 1 is the sum of the inputs and the output at port 4 is the difference of the inputs.

The sum/difference control module, or unit, 110 determines the angular position 60 of the source of the inbound wireless signal based on the sum signal and the difference signal. Such a computation is known. The output module 120, which may be a summing modules, generates the representation 62 of the inbound wireless signal 58 based on the plurality of phase shifted inbound wireless signals.

Figure 21:
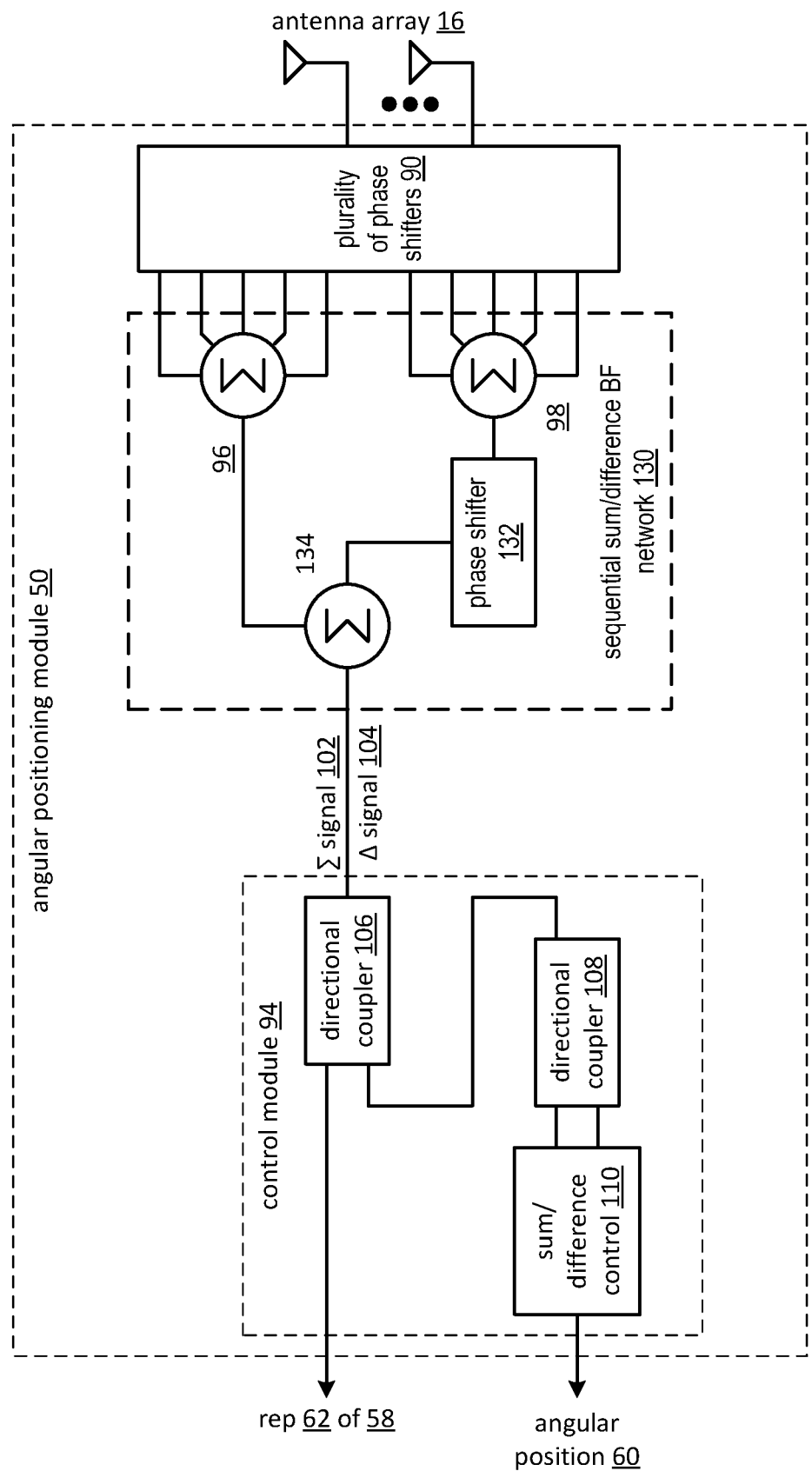
FIG. 21 is a schematic block diagram of another embodiment of an angular positioning module in accordance with the present invention.

FIG. 21 is a schematic block diagram of another embodiment of an angular positioning module 50 that includes a plurality of phase shifters 90, a sequential sum/difference beamforming network 130, and a control module 94. The sequential sum/difference beamforming network 130 includes a summing module 96, a difference module 98, a phase shifter 132, and a second summing module 134.

In an example of operation, the plurality of phase shifters 90 phase shifts the plurality of received inbound wireless signals to produce a plurality of phase shifted inbound wireless signals. The sequential sum-difference beamforming network 130 sequentially generates a sum signal and a difference signal from the plurality of phase shifted inbound wireless signals.

As an example of operation of the sequential sum-difference beamforming network, the summing module 96 sums the plurality of phase shifted inbound wireless signals to produce a sum component. The difference module 98 generates a difference component from the plurality of phase shifted inbound wireless signals. The at least one 1-bit phase shifter inverts or does not invert the difference component to produce a phase shifted difference component. The combining module (e.g., the second summing module) 134 combines the sum component and the phase shifted difference component to produce the sequential sum signal and the difference signal.

The control module 94 receives the resulting sum and difference signals 102 and 104 via directional couplers 106 & 108. From these signals, the sum/difference control unit 110 determines the angular location 60 of the source of the inbound wireless signal. The sum/difference control unit 110 may provide the control signal 67 (e.g., phase shift coefficients) to the phase shifters 90 such that the phase shifters 90 adjust their respective phase shifts, which yields adjusted first and second radiation patterns. Note that directional coupler 106 provides the output signal (e.g., the representation 62 of the inbound wireless signal 58).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A receiver comprising:
an angular positioning module configured to couple with an antenna array, the angular positioning module configured to:
receive a plurality of inbound wireless signals;
determine angular position of a source of an inbound wireless signal from at least some of the plurality of inbound wireless signals based on a first radiation pattern and a second radiation pattern of the plurality of inbound wireless signals;
adjust the first and the second radiation pattern to affect reception strength of the inbound wireless signal; and
output a representation of the inbound wireless signal.

2. The receiver of claim 1, wherein the angular positioning module comprising:
a plurality of phase shifters operably coupled to phase shift the at least some of the plurality of inbound wireless signals to produce a plurality of phase shifted inbound wireless signals;
a sum-difference beamforming network operably coupled to generate a sum signal and a difference signal from the plurality of phase shifted inbound wireless signals, wherein the sum signal is provided as the representation of the inbound wireless signal; and
a control module operably coupled to determine the angular position of the source of the inbound wireless signal based on the sum signal and the difference signal.

3. The receiver of claim 1, wherein the angular positioning module comprising:
- a plurality of phase shifters operably coupled to phase shift the at least some of the plurality of inbound wireless signals to produce a plurality of phase shifted inbound wireless signals;
- a sum-difference patterns network operably coupled to generate a sum signal and a difference signal from at least some of the plurality of phase shifted inbound wireless signals;
- a control module operably coupled to determine the angular position of the source of the inbound wireless signal based on the sum signal and the difference signal;
- an output module operably coupled to generate the representation of the inbound wireless signal based on the at least some of the plurality of phase shifted inbound wireless signals.

4. The receiver of claim 3, wherein the sum-difference patterns network comprising:
- a 180 hybrid circuit.

5. The receiver of claim 1, wherein the angular positioning module comprising:
- a plurality of phase shifters operably coupled to phase shift the at least some of the plurality of inbound wireless signals to produce a plurality of phase shifted inbound wireless signals;
- a sequential sum-difference beamforming network operably coupled to sequentially generate a sum signal and a difference signal from the plurality of phase shifted inbound wireless signals, wherein the sum signal is provided as the representation of the inbound wireless signal; and
- a control module operably coupled to determine angular position of the source of the inbound wireless signal based on the sum signal and the difference signal.

6. The receiver of claim 5, wherein the sequential sum-difference beamforming network comprising:
- a summing module operably coupled to sum the plurality of phase shifted inbound wireless signals to produce a sum component;
- a difference module operably coupled to generate a difference component from the plurality of phase shifted inbound wireless signals;
- a least one 1-bit phase shifter operably coupled to invert or not invert the difference component to produce a phase shifted difference component; and
- a combining module operably coupled to combine the sum component and the phase shifted difference component to produce the sum signal and the difference signal.

7. The receiver of claim 1, wherein the antenna array comprising:
- a linear antenna array.

8. The receiver of claim 1 further comprising:
- at least one integrated circuit that contains the angular positioning module, a low noise amplifier module, and a down conversion module.

9. A receiver with angular positioning, the receiver comprising:
- an angular positioning module configured to couple with an antenna array, wherein the angular positioning module is operable to:
  - receive a plurality of inbound wireless signals from the antenna array;
  - determine angular position of a source of at least one inbound wireless signal from a plurality of inbound wireless signals based on a first radiation pattern and a second radiation pattern;
  - adjust the first and the second radiation pattern to affect reception strength of the at least one inbound wireless signal; and
  - output a representation of the at least one inbound wireless signal.

10. The receiver of claim 9, wherein the angular positioning module comprises:
- a plurality of phase shifters operably coupled to phase shift the plurality of inbound wireless signals to produce a plurality of phase shifted inbound wireless signals;
- a sum-difference beamforming network operably coupled to generate a sum signal and a difference signal from the plurality of phase shifted inbound wireless signals; and
- a control module operably coupled to determine angular position of the source of the at least one inbound wireless signal based on the sum signal and the difference signal.

11. The receiver of claim 9, wherein the angular positioning module comprises:
- a plurality of phase shifters operably coupled to phase shift the plurality of inbound wireless signals to produce a plurality of phase shifted inbound wireless signals;
- a sum-difference patterns network operably coupled to generate a sum signal and a difference signal from at least some of the plurality of phase shifted inbound wireless signals; and
- a control module operably coupled to determine the angular position of the source of the at least one inbound wireless signal based on the sum signal and the difference signal.

12. The receiver of claim 9, wherein the angular positioning module comprises:
- a plurality of phase shifters operably coupled to phase shift the plurality of inbound wireless signals to produce a plurality of phase shifted inbound wireless signals;
- a sequential sum-difference beamforming network operably coupled to sequentially generate a sum signal and a difference signal from the plurality of phase shifted inbound wireless signals; and
- a control module operably coupled to determine angular position of the source of the at least one inbound wireless signal based on the sum signal and the difference signal.

13. The receiver of claim 12, wherein the sequential sum-difference beamforming network comprises:
- a summing module operably coupled to sum the plurality of phase shifted inbound wireless signals to produce a sum component;
- a difference module operably coupled to generate a difference component from the plurality of phase shifted inbound wireless signals;
- a least one 1-bit phase shifter operably coupled to invert or not invert the difference component to produce a phase shifted difference component; and
- a combining module operably coupled to combine the sum component and the phase shifted difference component to produce the sum signal and the difference signal.

14. The receiver of claim 9 wherein the antenna array is configured in an end-fire manner.

15. A video gaming receiver comprising:
- an antenna array operable to receive an inbound wireless signal from a video gaming object; and
- an angular positioning module coupled to the antenna array, wherein the angular positioning module is configured to:
  - receive a plurality of inbound wireless signals from the antenna array;
  - determine angular position of the video gaming object from the inbound wireless signal of the plurality of inbound wireless signals based on a first radiation pattern and a second radiation pattern of the plurality of inbound wireless signals;

adjust the first and the second radiation pattern to affect reception strength of the inbound wireless signal; and output a representation of the inbound wireless signal.

16. The video gaming receiver of claim 15, wherein the angular positioning module comprising:

a plurality of phase shifters operably coupled to phase shift the plurality of inbound wireless signals to produce a plurality of phase shifted inbound wireless signals;

a sum-difference beamforming network operably coupled to generate a sum signal and a difference signal from the plurality of phase shifted inbound wireless signals, wherein the sum signal is provided as the representation of the inbound wireless signal; and a control module operably coupled to determine the angular position of the inbound wireless signal based on the sum signal and the difference signal.

17. The video gaming receiver of claim 15, wherein the angular positioning module comprising:

a plurality of phase shifters operably coupled to phase shift the plurality of inbound wireless signals to produce a plurality of phase shifted inbound wireless signals;

a sum-difference patterns network operably coupled to generate a sum signal and a difference signal from at least some of the plurality of phase shifted inbound wireless signals;

a control module operably coupled to determine angular position of the source of the inbound wireless signal based on the sum signal and the difference signal; and an output module operably coupled to generate the representation of the inbound wireless signal based on the some of the plurality of phase shifted inbound wireless signals.

18. The video gaming receiver of claim 15, wherein the angular positioning module comprising:

a plurality of phase shifters operably coupled to phase shift the plurality of inbound wireless signals to produce a plurality of phase shifted inbound wireless signals;

a sequential sum-difference beamforming network operably coupled to sequentially generate a sum signal and a difference signal from the plurality of phase shifted inbound wireless signals, wherein the sum signal is provided as the representation of the inbound wireless signal; and a control module operably coupled to determine angular position of the source of the inbound wireless signal based on the sum signal and the difference signal.

19. The video gaming receiver of claim 15, wherein the sequential sum-difference beamforming network comprising:

a summing module operably coupled to sum the plurality of phase shifted inbound wireless signals to produce a sum component;

a difference module operably coupled to generate a difference component from the plurality of phase shifted inbound wireless signals;

a least one 1-bit phase shifter operably coupled to invert or not invert the difference component to produce a phase shifted difference component; and a combining module operably coupled to combine the sum component and the phase shifted difference component to produce the sum signal and the difference signal.

20. The video gaming receiver of claim 15 further comprising:

a low noise amplifier module operably coupled to amplify the representation of the inbound wireless signal to produce an amplified inbound wireless signal;

a down conversion module operably coupled to convert the amplified inbound wireless signal into a baseband or near baseband signal; and a baseband processing module operably coupled to convert the baseband or near baseband signal into video gaming data.

* * * * *